(12) United States Patent
Karins et al.

(10) Patent No.: US 8,527,445 B2
(45) Date of Patent: Sep. 3, 2013

(54) APPARATUS, SYSTEM, AND METHOD FOR OBJECT DETECTION AND IDENTIFICATION

(75) Inventors: James P. Karins, Ewa Beach, HI (US); Stuart A. Mills, West Hills, CA (US)

(73) Assignee: Pukoa Scientific, LLC, Honolulu, HI (US)

( * ) Notice: Subject to any disclaimer, the term of this patent is extended or adjusted under 35 U.S.C. 154(b) by 275 days.

(21) Appl. No.: 12/959,207

(22) Filed: Dec. 2, 2010

(65) Prior Publication Data

US 2012/0143808 A1 Jun. 7, 2012

(51) Int. Cl.
*G06N 5/02* (2006.01)

(52) U.S. Cl.
USPC .............................................. 706/46; 706/16

(58) Field of Classification Search
None
See application file for complete search history.

(56) References Cited

U.S. PATENT DOCUMENTS

| | | | |
|---|---|---|---|
| 5,214,744 A * | 5/1993 | Schweizer et al. | 382/103 |
| 6,014,461 A * | 1/2000 | Hennessey et al. | 382/195 |
| 6,499,025 B1 * | 12/2002 | Horvitz et al. | 706/52 |
| 6,502,082 B1 * | 12/2002 | Toyama et al. | 706/16 |
| 6,529,614 B1 * | 3/2003 | Chao et al. | 382/103 |
| 6,724,915 B1 * | 4/2004 | Toklu et al. | 382/103 |
| 6,754,368 B1 * | 6/2004 | Cohen | 382/103 |
| 6,757,571 B1 * | 6/2004 | Toyama | 700/47 |
| 6,850,627 B2 | 2/2005 | Phillips | |
| 7,286,707 B2 | 10/2007 | Liu et al. | |
| 7,454,037 B2 * | 11/2008 | Higgins | 382/103 |
| 7,466,841 B2 | 12/2008 | Bahlmann et al. | |
| 7,639,841 B2 | 12/2009 | Zhu et al. | |
| 7,974,475 B1 * | 7/2011 | Minter | 382/209 |
| 8,005,261 B2 * | 8/2011 | Baur et al. | 382/103 |
| 2001/0036293 A1 * | 11/2001 | Laumeyer et al. | 382/104 |
| 2001/0043717 A1 * | 11/2001 | Laumeyer et al. | 382/104 |
| 2004/0267682 A1 * | 12/2004 | Baur et al. | 706/20 |
| 2005/0104959 A1 * | 5/2005 | Han et al. | 348/143 |
| 2005/0105765 A1 * | 5/2005 | Han et al. | 382/100 |
| 2005/0265582 A1 * | 12/2005 | Buehler et al. | 382/103 |
| 2008/0025568 A1 | 1/2008 | Han et al. | |
| 2009/0028347 A1 * | 1/2009 | Duraiswami et al. | 381/26 |
| 2009/0116747 A1 * | 5/2009 | Duong et al. | 382/195 |
| 2009/0304230 A1 | 12/2009 | Krahnstoever et al. | |
| 2010/0008540 A1 * | 1/2010 | Shet et al. | 382/103 |

(Continued)

OTHER PUBLICATIONS

Moore J. et al., "Tracking Targets with Self-Organizing Distributed Ground Sensors", Proceedings of the IEEE Aerospace Conference, vol. 5, pp. 2113-2123, 2003.*

(Continued)

*Primary Examiner* — Jeffrey A Gaffin
*Assistant Examiner* — Dave Misir
(74) *Attorney, Agent, or Firm* — Kunzler Law Group

(57) ABSTRACT

An apparatus, system, and method are disclosed for identifying a target object. An object detection module detects objects by matching data from one or more sensors to known data of a target object and determining one or more correlation metrics for each object. An object tracking module tracks geographic locations for detected objects over time using subsequent data from the one or more sensors. A contextual data module determines one or more contextual indicators for detected objects based on the data from the one or more sensors. An artificial intelligence module estimates probabilities that detected objects comprise the target object based on the correlation metrics, the geographic locations, the contextual indicators, and one or more target contextual indicators associated with the target object. The artificial intelligence module estimates the probabilities using an artificial intelligence model, such as a Bayesian network.

43 Claims, 9 Drawing Sheets

(56) References Cited

U.S. PATENT DOCUMENTS

| | | | |
|---|---|---|---|
| 2010/0021009 A1 | 1/2010 | Yao | |
| 2010/0322534 A1* | 12/2010 | Bolme et al. | 382/278 |
| 2012/0011119 A1* | 1/2012 | Baheti et al. | 707/737 |
| 2012/0011142 A1* | 1/2012 | Baheti et al. | 707/769 |
| 2012/0105634 A1* | 5/2012 | Meidan et al. | 348/143 |

OTHER PUBLICATIONS

Brooks R. et al., "Tracking multiple targets with self-organizing distributed ground sensors", Journal of Parallel and Distributed Computing, 64, pp. 874-884, 2004.*

Liu J. et al., "Distributed Group Management in Sensor Networks: Algorithms and Applications to Localization and Tracking", Telecommunication Systems 26:2-4, pp. 235-251, 2004.*

Biswas P. et al., "Self-Organizing Sensor Networks for Integrated Target Surveillance", IEEE Transactions on Computers, vol. 55, No. 8, pp. 1033-1047, August 2006.*

Nillius P. et al., "Multi-Target Tracking—Linking Identities using Bayesian Network Inference", Proceedings of the IEEE Computer Society Conference on Computer Vision and Pattern Recognition, 2006.*

Song X. et al., "Vision-Based Multiple Interacting Targets Tracking via On-Line Supervised Learning", ECCV 2008, Part III, LNCS 5304, pp. 642-655, 2008.*

Wang Q. et al., "Pattern Recognition for Ship Based on Bayesian Networks", Fourth International Conference on Fuzzy Systems and Knowledge Discovery, 2007.*

Oerlemans A. et al., "Real-Time Object Tracking with Relevance Feedback", CIVR'07, pp. 101-104, Jul. 9-11, 2007.*

Moore et al., "Tracking Targets with Self-Organizing Distributed Ground Sensors", IEEE, Sep. 19, 2002.

Philippe Refregier, "Bayesian theory for target location in noise with unknown spectral density", Optical Society of America, vol. 16, No. 2, Feb. 1999.

Liu et al., "Distributed Group Management for Track Initiation and Maintenance in Target Localization Applications", LNCS 2634, pp. 113-128, 2003.

Phil Greenway, Distributed Object Recognition using Fuzzy Relational Inference Logic, SPIE vol. 2234, 1994.

Peter Nillius et al., "Multi-Target Tracking-Linking Identities using Bayesian Network Inference", IEEE, 2006.

Qing Jiang Wang et al., "Pattern Recognition for Ship Based on Bayesian Networks", Fourth International Conference on Fuzzy Systems and Knowledge Discovery, 207.

* cited by examiner

APPARATUS, SYSTEM, AND METHOD FOR OBJECT DETECTION AND IDENTIFICATION

BACKGROUND

1. Field of the Invention

This invention relates to object detection and more particularly relates to object detection and identification.

2. Description of the Related Art

Surveillance is becoming increasingly ubiquitous as homes and businesses alike adopt various security systems, cameras, or other surveillance measures. Similarly, satellites, unmanned vehicles, and the like provide surveillance and reconnaissance for government and military applications. Surveillance systems, whether for government or civilian use, typically generate large amounts of surveillance data.

For real-time surveillance or reconnaissance, the sheer amount of collected data can easily overwhelm manual human analysis. Especially for systems with multiple sensors, real-time data analysis can require crews of people to monitor all of the data, or a single person can switch between sensors or views, missing data from other sensors. For extended surveillance or reconnaissance, human fatigue can quickly cause errors. Manual human analysis of surveillance data can be severely limited in its timeliness and precision, especially in highly cluttered urban or harbor environments.

SUMMARY

From the foregoing discussion, it should be apparent that a need exists for an apparatus, system, and method that monitor sensor data to detect and identify target objects. Beneficially, such an apparatus, system, and method would identify target objects reliably with minimal false positives.

The present invention has been developed in response to the present state of the art, and in particular, in response to the problems and needs in the art that have not yet been fully solved by currently available surveillance and reconnaissance systems. Accordingly, the present invention has been developed to provide an apparatus, system, and method for object detection and identification that overcome many or all of the above-discussed shortcomings in the art.

The apparatus to identify a target object is provided with a plurality of modules configured to functionally execute the necessary steps of object detection and identification. These modules in the described embodiments include an object detection module, an object tracking module, a contextual data module, an artificial intelligence module, a target definition module, an object removal module, an identified target action module, a data conditioning module, a filter selection module, a correlation module, a correlation metric module, an object selection module, an object merge module, a motion module, and an action module.

In one embodiment, the object detection module detects a plurality of objects by matching data from one or more sensors to known data of a target object. The known data, in one embodiment, includes one or more spatial correlation filters corresponding to the target object. The target object, in another embodiment, is a mobile object capable of independent physical motion. In a further embodiment, the object detection module determines one or more correlation metrics for each object. The object detection module, in certain embodiments, iteratively updates correlation metrics based on subsequent data from the one or more sensors.

In one embodiment, the object tracking module tracks geographic locations for at least a subset of the plurality of objects over time. The object tracking module tracks the geographic locations, in another embodiment, using subsequent data from the one or more sensors. The geographic location that the object tracking module tracks for an object, in a further embodiment, includes geographic coordinates of the object, an estimated velocity of the object, and/or an estimated direction of the object. The object tracking module, in one embodiment, iteratively updates the geographic locations using subsequent data from the one or more sensors.

The object tracking module, in another embodiment, estimates multiple hypothesis tracks for an object of the plurality of objects. In one embodiment, the object tracking module estimates the multiple hypothesis tracks in response to the object being obscured in subsequent data from the one or more sensors. In a further embodiment, the object tracking module tracks multiple hypothesis geographic locations for the object along the estimated multiple hypothesis tracks. The object tracking module, in one embodiment, selects one of the multiple hypothesis tracks for the object as a most likely track. In another embodiment, the object tracking module determines a geographic location for an object based on the most likely track.

In one embodiment, the contextual data module determines one or more contextual indicators for at least a subset of the plurality of objects based on the data from the one or more sensors. The one or more contextual indicators for the plurality of objects, in a further embodiment, each indicate a detected physical property of an object. At least one of the contextual indicators, in various embodiments, is a color of an object, a temperature of an object, an estimated destination of an object, and/or an identifying marking on an object. In another embodiment, the contextual data module iteratively updates the one or more contextual indicators based on the subsequent data from the one or more sensors.

In one embodiment, the artificial intelligence module estimates probabilities that each of at least a subset of the plurality of objects comprises the target object. The artificial intelligence module, in a certain embodiment, bases the estimated probabilities on the correlation metrics, the geographic locations, the contextual indicators, and on one or more target contextual indicators associated with the target object. The one or more target contextual indicators, in another embodiment, each indicate an expected physical property of the target object. In a further embodiment, the artificial intelligence module estimates the probabilities using an artificial intelligence model.

The artificial intelligence module, in one embodiment, iteratively updates estimated probabilities based on updated correlation metrics, updated geographic locations, and updated contextual indicators. In one embodiment, the artificial intelligence module selects a subset of the plurality of objects for the object tracking module to track. The artificial intelligence module, in another embodiment, determines a confidence metric corresponding to each estimated probability. Each confidence metric, in a further embodiment, represents a strength of an estimated probability.

In one embodiment, the artificial intelligence model that the artificial intelligence module uses to estimate the probabilities is a Bayesian network model. A Bayesian network model, in one embodiment, represents a set of random variables and conditional dependencies of the set of random variables as a directed acyclic graph ("DAG"). The set of random variables, in a further embodiment, includes random variables representing the correlation metrics, the geographic locations, and the contextual indicators.

In one embodiment, the conditional dependencies of the set of random variables include one or more probability functions. The one or more probability functions, in one embodiment, define an estimated probability that a detected object comprises the target object based on values of the set of random variables. The artificial intelligence module, in a further embodiment, estimates the probabilities using the one or more probability functions. At least one of the one or more probability functions, in one embodiment, includes a probability table with an entry for possible combinations of values for random variables associated with the at least one probability function from the set of random variables.

In one embodiment, the target definition module determines the known data of the target object and the one or more target contextual indicators for the target object based on user input. In a further embodiment, the target definition module updates one or more of the target contextual indicators based on the data from the one or more sensors. The object removal module, in one embodiment, removes an object from the plurality of objects in response to the estimated probability for the object satisfying a removal threshold.

In one embodiment, the identified target action module performs an identified target action corresponding to an object in response to the estimated probability for the object satisfying an identification threshold. In one embodiment, the data from the one or more sensors comprises an image of terrain in which the plurality of objects is located. The subsequent data from the one or more sensors, in a further embodiment, comprises a subsequent image of at least a portion of the terrain.

In one embodiment, the data conditioning module conditions the data from the one or more sensors to prepare the data for the object detection module, the object tracking module, and the contextual data module. In one embodiment, the filter selection module estimates a scale of the image of the terrain. In another embodiment, the filter selection module estimates an angle of view for the image of the terrain. The filter selection module, in a further embodiment, selects one or more spatial correlation filters corresponding to the target object based on the estimated scale and the estimated angle of view.

In one embodiment, the correlation module correlates the one or more selected spatial correlation filters and the image of the terrain to form one or more correlation planes. The correlation module, in a further embodiment, correlates the one or more selected spatial correlation filters and the image of the terrain by performing a Fourier transform on the image of the terrain and on the one or more selected spatial correlation filters. In another embodiment, the correlation module, for each transformed spatial correlation filter, multiplies the transformed image of the terrain by the transformed spatial correlation filter. The correlation module, in one embodiment, performs an inverse Fourier transform on a result of the multiplication to form one of the one or more correlation planes.

In one embodiment, the correlation metric module determines one or more correlation metrics for each point in the one or more correlation planes. The one or more correlation metrics, in one embodiment, include a peak-to-correlation energy ("PCE"). In another embodiment, the one or more correlation metrics include a peak-to-sidelobe ratio ("PSR"). The one or more correlation metrics, in a further embodiment, include a peak magnitude of a point in a correlation plane. In one embodiment, the one or more correlation metrics include a standard deviation over a region of a correlation plane. The object selection module, in one embodiment, selects the plurality of detected objects based on the correlation metrics.

In one embodiment, the one or more correlation planes include a plurality of correlation planes and the object merge module detects multiple detected objects within a predefined distance of each other in different correlation planes. In another embodiment, the object merge module combines the multiple detected objects from different correlation planes into a single detected object.

In one embodiment, the motion module compensates for motion of the one or more sensors between the image of the terrain and the subsequent image of at least a portion of the terrain. The action module, in one embodiment, estimates an action state for one or more of the plurality of objects based on the data from the one or more sensors and on the subsequent data from the one or more sensors. In a further embodiment, the action module estimates the action state using the artificial intelligence model.

A system of the present invention is also presented to identify a target object. The system may be embodied by one or more sensors, an object detection module, an object tracking module, a contextual data module, and an artificial intelligence module. In particular, the system, in one embodiment, includes one or more processors and a computer readable storage medium. The system may further include an unmanned vehicle housing the one or more sensors, the one or more processors, and the computer readable storage medium.

A method of the present invention is also presented for identifying a target object. The method in the disclosed embodiments substantially includes the steps necessary to carry out the functions presented above with respect to the operation of the described apparatus and system. In one embodiment, the method includes detecting a plurality of objects by matching data from one or more sensors to known data of a target object and determining one or more correlation metrics for each object. The method, in another embodiment, includes tracking geographic locations for at least a subset of the plurality of objects over time using subsequent data from the one or more sensors. In a further embodiment, the method includes determining one or more contextual indicators for at least a subset of the plurality of objects based on the data from the one or more sensors.

In one embodiment, the method includes estimating, using an artificial intelligence model, probabilities that each of at least a subset of the plurality of objects comprises the target object based on the correlation metrics, the geographic locations, the contextual indicators, and one or more target contextual indicators associated with the target object. The method, in a further embodiment, includes determining the known data of the target object and the one or more target contextual indicators for the target object based on user input. In another embodiment, the method includes removing an object from the plurality of objects in response to the estimated probability for the object satisfying a removal threshold. The method, in one embodiment, includes performing an identified target action corresponding to an object in response to the estimated probability for the object satisfying an identification threshold.

The data from the one or more sensors, in one embodiment, includes an image of terrain in which the plurality of objects are located and the subsequent data from the one or more sensors includes a subsequent image of at least a portion of the terrain. The method, in one embodiment, includes estimating a scale of the image of the terrain. In a further embodiment, the method includes estimating an angle of view for the image of the terrain. The method, in another embodiment, includes selecting one or more spatial correlation filters corresponding to the target object based on the estimated scale and the estimated angle of view. In one embodiment, the method includes correlating the one or more selected spatial correlation filters and the image of the terrain to form one or more correlation planes. In another embodiment, the method includes determining the one or more correlation metrics for each point in the one or more correlation planes. The method, in a further embodiment, includes selecting the plurality of detected objects based on the correlation metrics.

In one embodiment, the method includes detecting multiple detected objects within a predefined distance of each other in different correlation planes and combining the multiple detected objects into a single detected object. The method, in another embodiment, includes compensating for motion of the one or more sensors between the data from the one or more sensors and the subsequent data from the one or more sensors. In a further embodiment, the method includes estimating an action state for one or more of the plurality of objects, using the artificial intelligence model, based on the data from the one or more sensors and on the subsequent data from the one or more sensors.

A computer program product of the present invention is also presented for identifying a target object. The computer program product includes a computer readable medium. The computer readable medium has computer usable program code executable to perform operations for identifying a target object. The operations in the disclosed embodiments substantially include the steps necessary to carry out the functions presented above with respect to the operation of the described apparatus, system, and method.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
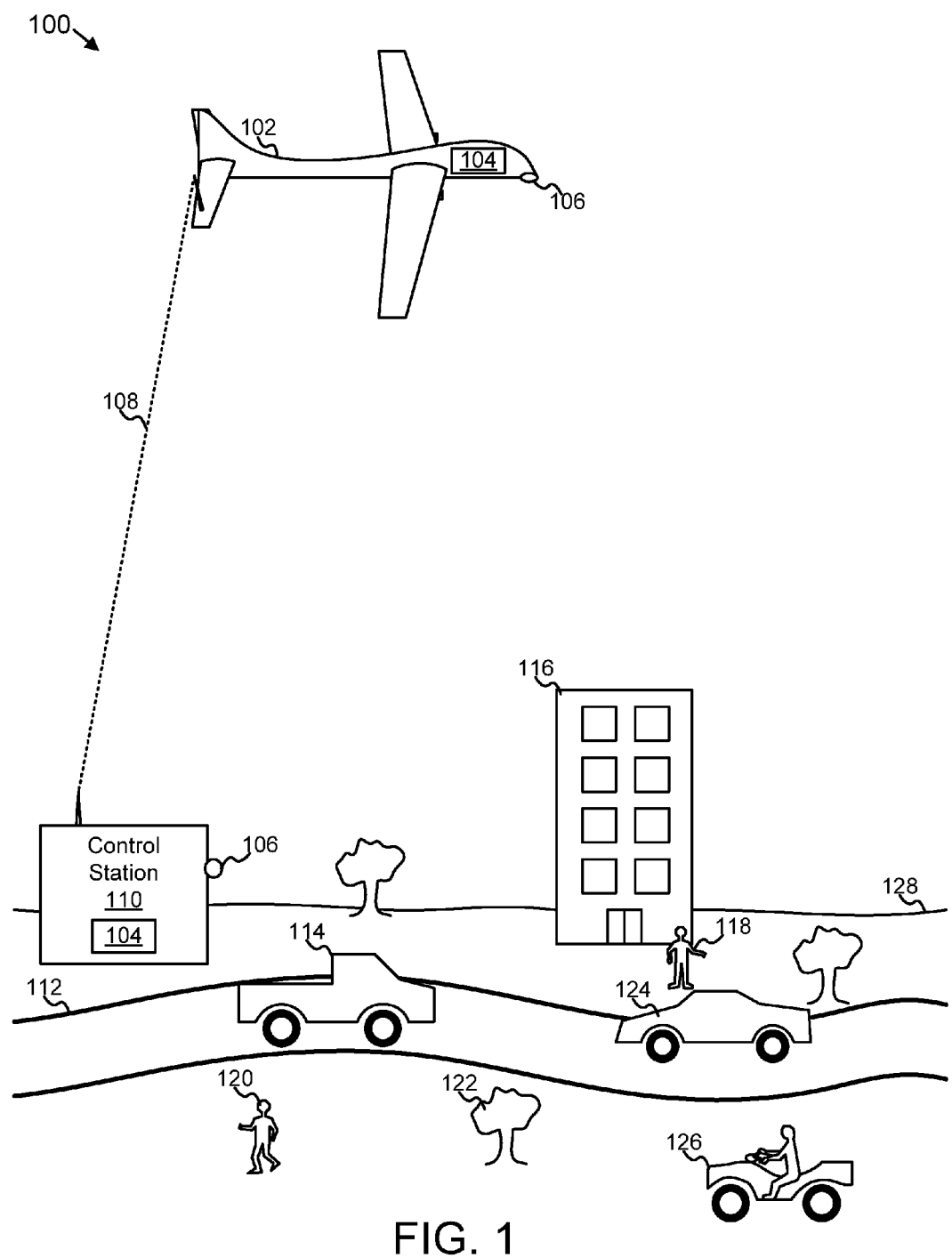
FIG. 1 is a schematic block diagram illustrating one embodiment of a system to identify a target object in accordance with the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable mediums.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Aspects of the present invention are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer instructions.

FIG. 1 depicts one embodiment of a system 100 to detect and identify a target object. The depicted embodiment of the system 100 includes an unmanned vehicle 102 that is in communication with a control station 110 over a communications channel 108. In the depicted embodiment, the unmanned vehicle 102 and the control station 110 each include at least a portion of a target identification module 104 and one or more sensors 106 that monitor a terrain 128.

In one embodiment, the system 100 provides real-time automated detection, tracking, location, and/or the like, of mobile targets or objects of interest in various environments. In a further embodiment, the system 100 provides a processing framework for reacquisition of pre-briefed or previously encountered targets. In the reacquisition role, in one embodiment, the system 100 tracks objects as an aid to positively identify a target object. In another embodiment, the system 100 provides persistent surveillance of one or more target objects. The system 100, in one embodiment, detects and identifies a target object using an artificial intelligence model that combines correlation data, tracking data, and contextual data to accurately identify the target object with little or no false positives. A target object, in various embodiments, may be a specific object, such as a pre-briefed or previously encountered target, a class of target objects having one or more common characteristics, or the like.

In the depicted embodiment, the unmanned vehicle 102 is embodied by an unmanned aircraft that is part of an unmanned aircraft system ("UAS"). An unmanned aircraft system, in various embodiments, may include one or more unmanned vehicles 102, one or more control stations 110, one or more communications channels 108 between unmanned vehicles 102 and control stations 110, and the like. In other embodiments, the unmanned vehicle 102 may include an unmanned ground vehicle, an unmanned underwater vehicle, and/or another type of unmanned vehicle 102. In a further embodiment, the system 100, either instead of or in conjunction with the unmanned vehicle 102, may include a manned vehicle with one or more operators or other crew members. Like the depicted unmanned vehicle 102, a manned vehicle, in certain embodiments, may include a target identification module 104, one or more sensors 106, and the like.

The unmanned vehicle 102, in the depicted embodiment, is a reusable, crewless aircraft capable of controlled, sustained flight. The unmanned vehicle 102, in one embodiment, provides airborne reconnaissance of the terrain 128 in an air-to-ground environment. The unmanned vehicle 102, in a further embodiment, may be configured and outfitted for one or more combat, civil, or commercial tasks. The unmanned vehicle 102, in various embodiments, may be propelled by one or more jet engines, propellers, rotors, or the like.

The unmanned vehicle 102, in one embodiment, is in communication with one or more control stations 110 over the communications channel 108. The communications channel 108, in one embodiment, is a wireless data channel. A control station 110 may be located in a building, in a ship, in another aircraft, or in another location separate from the unmanned vehicle 102. In one embodiment, the unmanned vehicle 102 receives control data from a control station 110 and transmits reconnaissance data, navigation data, and/or other data to the control station 110. In one embodiment, a control station 110 performs substantially all guidance and piloting functions for the unmanned vehicle 102. In a further embodiment, the unmanned vehicle may be partially or completely autonomous, performing one or more guidance or piloting functions autonomously on-board the unmanned vehicle 102.

In the depicted embodiment, the unmanned vehicle 102 includes at least a portion of the target identification module 104 and one or more sensors 106. In one embodiment, the target identification module 104 is located substantially entirely on-board the unmanned vehicle 102. In another embodiment, the target identification module 104 is distributed between the unmanned vehicle 102 and one or more control stations 110. In a further embodiment, the target identification module is located substantially entirely at a control station 110. The one or more sensors 106, in various embodiments, may be disposed on-board the unmanned vehicle 102, at a control station 110, at one or more remote locations in the terrain 128, on-board one or more satellites above the terrain 128, in a combination of these and other locations, or the like.

In one embodiment, the unmanned vehicle 102 includes one or more computer readable media to store executable code of the target identification module 104, data from the one or more sensors 106, and the like and one or more processors to execute the executable code of the target identification module 104, process the data from the one or more sensors 106, and the like. The unmanned vehicle 102, in a further embodiment, includes one or more processors with multiple processing cores using a parallel computing architecture, such as symmetric multiprocessing ("SMP"), compute unified device architecture ("CUDA"), open computing language ("OpenCL"), general-purpose computing on graphics processing units ("GPGPU"), DirectCompute, stream computing, and the like.

The multiple processing cores, in various embodiments, may be part of one or more central processing units ("CPUs"), graphics processing units ("GPUs"), field programmable gate arrays ("FPGAs"), and the like. In one embodiment, the use of a parallel computing architecture, such as CUDA hardware, allows the target identification module 104 to process sensor data 106, detect objects, and identify target objects at or near real-time, achieving various throughput and latency objectives associated with real-time object identification.

The one or more sensors 106, in one embodiment, collect data of the terrain 128 and/or data of objects associated with the terrain 128. Examples of sensors 106, in various embodiments, may include optical sensors that collect photo and/or video data, infrared sensors such as mid-wavelength infrared sensors and the like, radar sensors, sonar sensors, motion sensors, acoustic sensors such as a microphone or microphone array, and/or other sensors capable of collecting data of a terrain 128.

At least one sensor 106, in a certain embodiment, provides a series of images of the terrain 128 in which objects are located. A series of images, in various embodiments, may include photographs, video frames, infrared images, and other visual depictions of the terrain 128, characteristics of the terrain 128, or the like. While the terrain 128, in the depicted embodiment, is predominately land-based, in other embodiments, the terrain 128 may be air-based to detect airborne objects, water-based (either the water surface or underwater) to detect waterborne or underwater objects, a mixture of land-based, air-based, and/or water-based, or the like. In one embodiment, several sensors 106 may be arranged in a sensor grid, a sensor array, or the like.

Embodiments of the target identification module 104 are described in greater detail below with regard to FIGS. 2 and 3. In general, the target identification module 104 processes data from the sensors 106 to detect and/or identify one or more target objects. In one embodiment, the target identification module 104 matches data from the one or more sensors 106 to known data of a target object to detect objects that may potentially include a target object. In a further embodiment, the target identification module 104 determines one or more correlation metrics for each detected object identifying how closely the sensor data corresponding to the detected object matches the known data of the target object. In one embodiment, the target identification module 104 may use data from sensors 106 in multiple locations with multiple view points. In another embodiment, the target identification module 104 may manipulate a position, angle, or direction of a sensor 106 to gather additional data for detection and/or identification of an object.

In another embodiment, the target identification module 104 tracks geographic locations for one or more detected objects over time based on data from the one or more sensors 106. The target identification module 104, in another embodiment, determines contextual indicators for one or more detected objects, such as a color, temperature, estimated destination, markings, damage, height, length, width, velocity, acceleration, and/or other contextual data for a detected object. In one embodiment, the target identification module 104 uses an artificial intelligence model to estimate a probability that a detected object is a target object based on correlation metrics, geographic locations, contextual indicators, and the like for detected objects. By using multiple types of data for object identification, in one embodiment, the target identification module 104 accurately identifies target objects while minimizing false positive identifications.

In one embodiment, where the target identification module 104 is housed on-board the unmanned vehicle 102, the target identification module 104 transmits data of detected objects and/or identified objects to one or more control stations 110. In a further embodiment, the unmanned vehicle 102 and/or the one or more sensors 106 transmit sensor data from the one or more sensors 106 to a target identification module 104 of a control station 110. In another embodiment, a target identification module 104 and one or more sensors 106 may operate at a control station 110, a building 116, or another location independent of an unmanned vehicle 102, as part of a security system, a surveillance system, or the like.

In one embodiment, a control station 110 displays detected objects, identified target objects, estimated probabilities, confidence levels, sensor data, and/or other data from the target identification module 104 to one or more users. For example, in various embodiments, a control station 110 may display images of the terrain 128, images or "chips" of detected and/or identified objects, and the like. In a further embodiment, a control station 110 may display visual indicators of detected and/or identified objects, such as colored boxes or shapes around an object, a probability that a detected object is a target object, a confidence level of an estimated probability, an estimated path of an object, a speed of an object, a direction of travel for an object, and/or other visual indicators.

In one embodiment, the target identification module 104 stores data of detected and/or identified objects in a database. Storing data of detected and/or identified objects, in various embodiments, may support pattern analysis, persistent object detection, persistent object identification, artificial intelligence learning or training for the target identification module 104, further processing of data, and/or provide other uses of the data.

In the depicted embodiment, the terrain 128 includes a road 112, a truck 114, a building 116, a stationary person 118, a running person 120, one or more trees 122, a car 124, and an off-road vehicle 126. In one embodiment, a target object may include a mobile object capable of independent physical motion, such as a vehicle 114, 124, 126, a person 118, 120, an animal, or the like. In a further embodiment, a target object may include a substantially stationary object such as a building 116, a geological formation, a landmark, or the like. The various objects depicted in the terrain 128 are discussed in greater detail below with regard to the example embodiments of the target identification module 104 of FIGS. 2 and 3.

Figure 2:
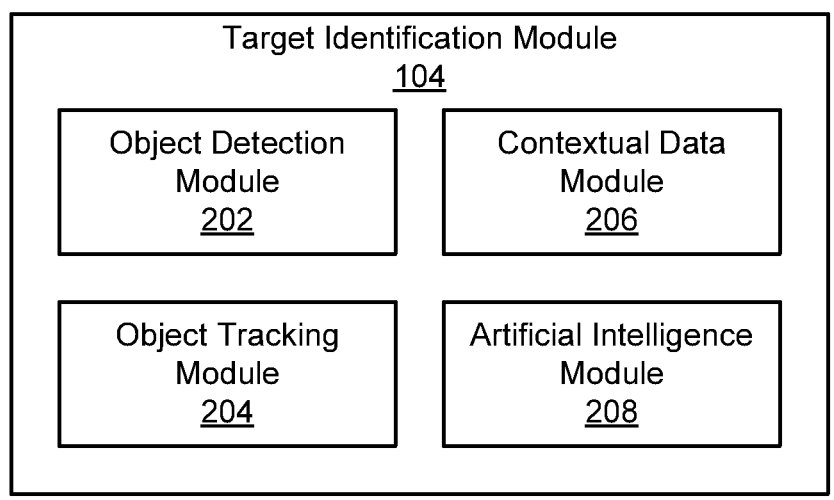
FIG. 2 is a schematic block diagram illustrating one embodiment of a target identification module in accordance with the present invention.

FIG. 2 depicts one embodiment of the target identification module 104. The target identification module 104, in the depicted embodiment, includes an object detection module 202, an object tracking module 204, a contextual data module 206, and an artificial intelligence module 208. In one embodiment, the target identification module 104 of FIG. 2 is substantially similar to the target identification module 104 described above with regard to FIG. 1.

In one embodiment, the object detection module 202 detects objects in data from one or more sensors 106. As used herein, in one embodiment, an object is a physical body or collection of bodies, and the object detection module 202 detects an object by detecting evidence of the object in data from one or more sensors 106. As described above, in various embodiments, objects may include mobile objects such as vehicles, people, animals, and the like and/or substantially stationary objects such as buildings, geological formations, landmarks, and the like.

The object detection module 202, in one embodiment, detects objects by matching data from one or more sensors 106 to known data of a predefined target object. In various embodiments, depending on the type of data from the one or more sensors 106, the object detection module 202 may scan or otherwise process the data from the one or more sensors 106 searching for the known data, searching for evidence or indicators of the known data, and/or otherwise matching the data from the one or more sensors 106 to known data of a target object. For example, in one embodiment, where the one or more sensors 106 include an acoustic sensor, the object detection module 202 may match one or more known sounds of a target object to the acoustic sensor data. In another embodiment, the object detection module 202 segments data from the one or more sensors 106 and matches each segment to the known data of the target object.

In one embodiment, the object detection module 202 uses correlation filtering or another pattern recognition technique to detect objects in sensor data, and the known data includes predefined correlation filters or other pattern data corresponding to a target object, such as spatial correlation filters, acoustic correlation filters, or the like. In a further embodiment, the object detection module 202 selects correlation filters or other pattern data from a filter bank or filter database that stores correlation filters or other pattern data defined for one or more target objects.

In one embodiment, a correlation filter provides a reference template for a target object and the object detection module 202 finds matches between the reference template and data from one or more sensors 106. One type of correlation filter is a matched filter. In one embodiment, a matched filter is an optimum linear detector of a signal corrupted with additive white noise. In a further embodiment, correlation filters may account for other corruptions and/or variations such as variations in angle, depression angle, scale, in-plane rotation, ther mal signature, or the like. One embodiment of correlation in the spatial-domain is expressed as:

$$c(\tau_x,\tau_y)=\iint t(x,y)r^*(x-\tau_x,y-\tau_y)dxdy \qquad (1)$$

In equation 1, t(x,y) represents input data from a sensor 106, r(x,y) represents a correlation filter, and the "*" operator indicates the complex conjugate of the function. To facilitate matching sensor data to known data of a target object, in one embodiment, the object detection module 202 converts and/or transforms the sensor data from a time domain, a spatial domain, or the like into another domain, such as the frequency domain, or the like. For example, in one embodiment, the object detection module 202 performs a Fourier transform, a Laplace transform, a Z transform, or the like on sensor data, such as infrared or visual image data, acoustic data, or other sensor data. In one embodiment, sensor data may be simpler to process or match to known data in the frequency domain than in the spatial or time domain.

The object detection module 202, in one embodiment, transforms the sensor data to the frequency domain using a fast Fourier transform, or another transform with reduced computational requirements. In a further embodiment, the object detection module 202 transforms sensor data to another domain, such as the frequency domain, using multiple processor cores having a parallel computing architecture, such as SMP, CUDA, OpenCL, GPGPU, DirectCompute, stream computing, or another parallel computing architecture. One embodiment of correlation using a fast Fourier transform is expressed as:

$$c(\tau_x, \tau_y) = \int\int T(f_x, f_y)R^*(f_x, f_y)e^{j2\pi(f_x\tau_x+f_y\tau_y)}df_xdf_y \qquad (2)$$
$$= FT^{-1}\{T(f_x, f_y)R^*(f_x, f_y)\}$$

In equation 2, $T(f_x,f_y)$ represents the Fourier transform of the input data from a sensor 106 and $R(f_x,f_y)$ represents the Fourier transform of the correlation filter.

Figure 3:
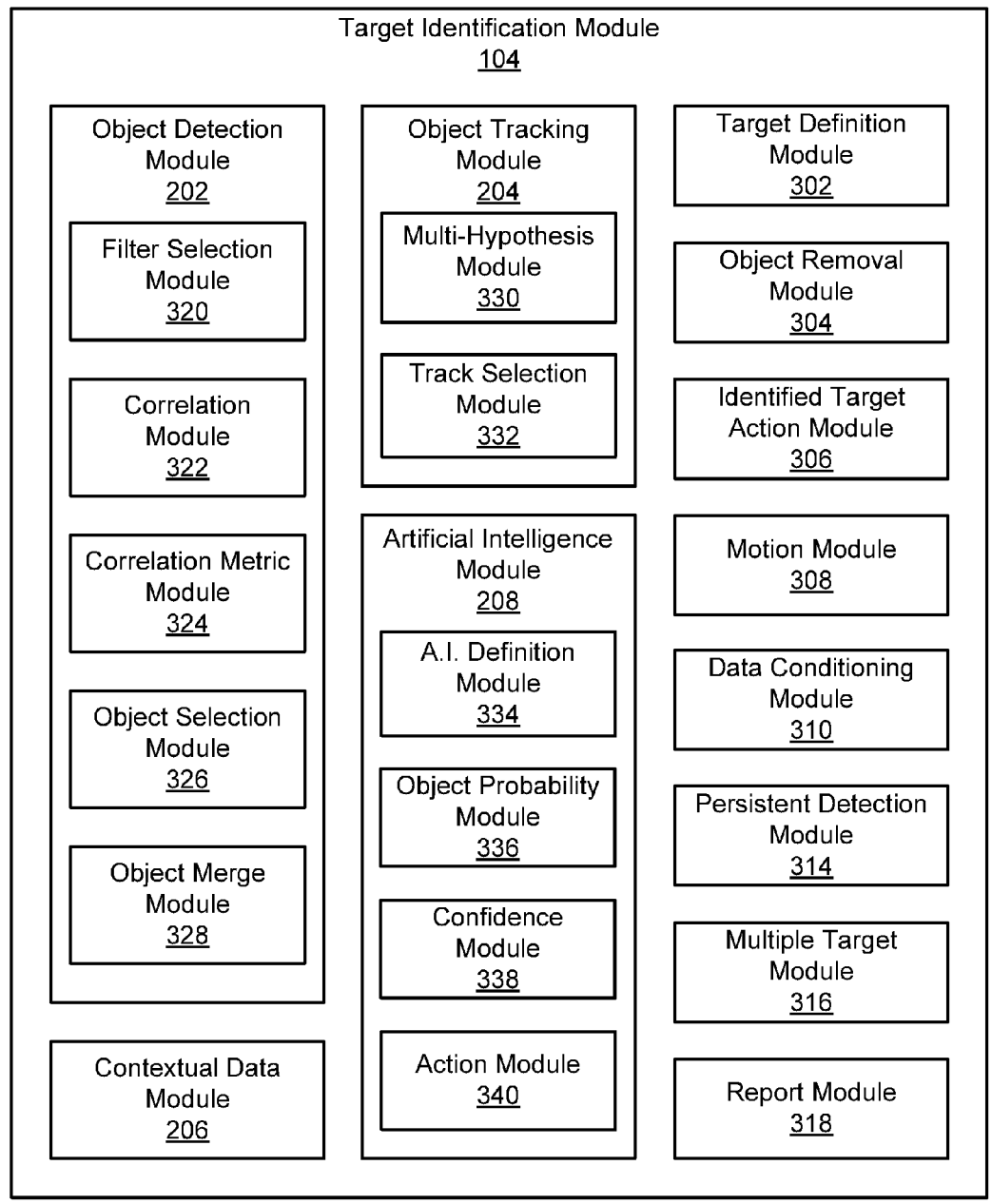
FIG. 3 is a schematic block diagram illustrating another embodiment of a target identification module in accordance with the present invention.

One embodiment of the object detection module 202 that uses correlation filtering is described in greater detail with regard to FIG. 3. In various embodiments, the object detection module 202 may estimate a scale of image data from one or more sensors 106, estimate an angle of view for image data from one or more sensors 106, select one or more spatial correlation filters corresponding to a target object based on an estimated scale and/or an estimated angle of view, correlate one or more selected spatial correlation filters and a sensor image to form one or more correlation planes, determine one or more correlation metrics for each point in one or more correlation planes, select one or more objects as detected objects based on the correlation metrics, and/or otherwise match sensor data to known data of a target object.

In another embodiment, instead of correlation filtering, the object detection module 202 uses feature based correlation to detect objects. Examples of feature based correlation, in various embodiments, include edge detection, corner detection, region of interest detection, size based correlation, or the like. One of skill in the art, in light of this disclosure, will recognize other ways in which the object detection module 202 may match sensor data to known data of a target object.

The object detection module 202, in one embodiment, determines one or more correlation metrics for each detected object. A correlation metric, as used herein, is an indicator of how closely a segment of sensor data matches known data of a target object. For example, in an embodiment where the object detection module 202 uses correlation filtering and one or more correlation planes, a correlation metric may include a peak-to-correlation energy ("PCE"), a peak-to-sidelobe ratio ("PSR"), a peak magnitude, a standard deviation, or another correlation metric for a detected object and/or a segment of sensor data. In other embodiments, a correlation metric may include a ranking of detected objects, a strength of a match, and/or other indicators of how closely a detected object matches a target object. In one embodiment, the object detection module 202 determines correlation metrics as part of the same process of matching sensor data to known data of a target object.

In one embodiment, the object detection module 202 detects a cluster of multiple detected objects within a predefined distance (for example, in different correlation planes, or the like) and combines or merges the cluster of multiple detected objects into a single detected object. For example, the object detection module 202 may use multiple correlation filters that create multiple correlation planes and may detect the same object in several correlation planes based on different correlation filters. In another example, the object detection module 202 may use data from multiple sensors 106 with different locations, angles, views, or the like, and may detect the same object in data from different sensors. In such embodiments, the object detection module 202 may combine the detections from the different correlation planes, from different sensors, or the like, recognizing that they represent the same object, based on a location of the object, a property of the object, or the like.

In one embodiment, the object detection module 202 iteratively updates object detections, correlation metrics, and/or other object detection information based on subsequent data from one or more sensors 106. The object detection module 202, in a further embodiment, updates object detections, correlation metrics, and the like substantially continuously as the object detection module 202 receives data from one or more sensors 106. In another embodiment, the object detection module 202 updates object detections, correlation metrics, and the like periodically. For example, in certain embodiments, the object detection module 202 may update object detections and correlation metrics a predefined number of times per second, per minute, per hour, or the like. In embodiments where sensor data includes video data, audio data, or another stream of data, the object detection module 202 may process every frame or segment of the stream of data, or may periodically process discrete frames or segments of the stream of data.

Referring back to FIG. 1, in one embodiment, the depicted one or more sensors 106 of the unmanned vehicle 102 include an optical, infrared, or other image sensor that provides images of the terrain 128. The object detection module 202, in one embodiment, detects one or more objects in the images from the one or more sensors 106. In different embodiments, the object detection module 202 may detect objects with various levels of similarity to a target object. For example, in one embodiment, either the object detection module 202 or the artificial intelligence module 208 selects a subset of detected objects that have a predefined level of similarity with a target object, based on one or more correlation metrics or the like. In one embodiment, the object detection module 202 detects a pool of potential target objects, and the object detection module 202 and/or the artificial intelligence module 208 iteratively updates membership of detected objects in the pool of potential target objects.

For example, in one embodiment, the car 124 may be defined as a target object, and the object detection module 202 may initially detect various objects, such as the truck 114, the building 116, the stationary person 118, the running person 120, the trees 122, the car 124, the off-road vehicle 126, and the like. Based on known data of the target object (the car 124, in this example), in one embodiment, the object detection module 202 and/or the artificial intelligence module 208 may select a subset of the detected objects as a pool of potential target objects, such as the truck 114, the car 124, the off-road vehicle 126, or the like. As is described below with regard to the artificial intelligence module 208, in one embodiment, the object detection module 202 provides detected objects, correlation metrics, and/or other object detection data to the artificial intelligence module 208. The object detection module 202, in various embodiments, may provide each detected object and associated data to the artificial intelligence module 208, may provide a subset of detected objects and associated data to the artificial intelligence module 208, or the like.

In one embodiment, the object tracking module 204 tracks geographic locations over time for at least a subset of objects that the object detection module 202 detects. The object tracking module 204, in one embodiment, uses data from one or more sensors 106 to determine the geographic locations of detected objects over time. In one embodiment, the object tracking module 204 tracks each object that the object detection module 202 detects. In a further embodiment, the object tracking module 204 tracks a subset of objects that the object detection module 202 detects, such as a potential target object pool, or the like. In one embodiment, the object tracking module 204 continues to track detected objects that the object detection module 202 and/or the artificial intelligence module 208 remove from and/or do not include in a potential target object pool, to prevent the object detection module 202 from re-detecting an object that has already been eliminated as a possible match for a target object.

In various embodiments, the geographic locations and associated information that the object tracking module 204 tracks for an object may include geographic coordinates of the object, an estimated velocity of the object, an estimated direction of the object, an estimated track for the object, and/or other location information pertaining to a detected object. In a further embodiment, the geographic location of a detected object includes ground-based coordinates, such as latitude and longitude, or the like for the detected object. The object tracking module 204, in one embodiment, iteratively updates geographic locations and/or associated location information of detected objects based on data from one or more sensors 106. For information such as velocity, direction, and tracks of detected objects that involve motion or a change in position, the object tracking module 204, in one embodiment, uses multiple data points from the one or more sensors 106 that are offset in time, such as a first image and a subsequent image, audio data from a first time and a subsequent time, or the like.

The object tracking module 204, in one embodiment, may determine or estimate a geographic location for a detected object based on a known location of a sensor 106, the unmanned vehicle 102, or the like relative to the sensor data corresponding to the detected object. For example, in one embodiment, the object tracking module 204 may use global positioning system ("GPS") data, inertial navigation system ("INS") data, a known fixed location, or the like for a sensor 106 and sensor line-of-sight information, audio volume or direction, radar or sonar information, or the like to estimate a geographic location for a detected object. In a further embodiment, the object tracking module 204 may use a digital elevation model for the terrain 128, map data associated with the terrain 128, geographic information system ("GIS") data associated with the terrain 128, and/or other data of the terrain 128 to assist in estimating a geographic location of a detected object. The object tracking module 204, in another embodiment, may use highly accurate INS, GPS, and/or sensor line-of-sight information to track detected objects in high clutter environments such as semi-urban environments, environments with dense vegetation, and the like.

In one embodiment, the object tracking module 204 estimates multiple hypothesis tracks for one or more detected objects. For example, in various embodiments, the object tracking module 204 may estimate multiple hypothesis tracks for each detected object, for detected objects in a potential target pool, for detected objects having a correlation metric that satisfies a predefined threshold, for a predefined number of detected objects, or the like. In one embodiment, the object tracking module 204 estimates multiple hypothesis tracks for a detected object in response to the detected object being obscured in data from one or more sensors 106. For example, in one embodiment, in response to a person 118, 120, a vehicle 114, 124, 126, and/or another detected object passing behind or otherwise being obscured from view by a building 116, a tree 122 or other foliage, a cloud, or the like, the object tracking module 204 estimates multiple hypothesis tracks for the obscured objects.

In a further embodiment, the object tracking module 204 tracks multiple hypothesis geographic locations for one or more detected objects along estimated multiple hypothesis tracks. In one embodiment, the object tracking module 204 determines a likelihood for each potential track. In another embodiment, the object tracking module 204 selects one track from multiple hypothesis tracks for a detected object as a most likely track and determines an estimated geographic location for the detected object based on the most likely track. One embodiment of an object tracking module 204 that estimates multiple hypothesis tracks is described in greater detail with regard to FIG. 3.

The artificial intelligence module 208, in certain embodiments, may determine likelihoods of the multiple hypothesis tracks, select a most likely track, and/or otherwise assist the object tracking module 204 in estimating multiple hypothesis tracks for a detected object. In various embodiments, the artificial intelligence module 204 may select a most likely track and/or a set of multiple hypothesis tracks for a detected object based on data for the detected object from the object detection module 202, data for the detected object from the contextual data module 204, known data for the terrain 128, and/or based on other data of the detected object, the terrain 128, or the like.

For example, the artificial intelligence module 204 and/or the object tracking module 204 may select a most likely track based at least partially on known constraints on motion that the terrain 128 provides, such as topography, bodies of water, roads, foliage, buildings, structures, and/or other features of the terrain 128 that affect a path of a detected object. In a further embodiment, the object tracking module 204, with or without assistance from the artificial intelligence module 208, tracks detected objects through complex motions and/or interactions between multiple detected objects, such as objects occupying the same point in time, and the like.

In one embodiment, the contextual data module 206 determines one or more contextual indicators for a detected object. A contextual indicator for an object, in one embodiment, identifies a detected physical property of the object. For example, in various embodiments, a contextual indicator may include a color of an object, a temperature of an object, an estimated destination of an object, an identifying feature or marking of an object, damage to an object, capabilities of an object, size of an object such as height, length, width, etc., velocity of an object, acceleration of an object, and/or other detected properties of an object. The contextual data module 206, in one embodiment, determines contextual indicators based on data from one or more sensors 106. In a further embodiment, the contextual data module 206 may determine certain contextual indicators based on data from the object tracking module 204, such as velocity of an object, acceleration of an object, a top speed for an object, an estimated destination for an object, and/or other contextual indicators relating to position, movement, or the like.

The contextual data module 206, in another embodiment, may determine a predefined set of contextual indicators for a detected object based on a set of known target contextual indicators for a defined target object. For example, in one embodiment, if a color and an estimated temperature range are known for a target object, the contextual data module 206 may determine a color and a temperature for a detected object. The contextual data module 206, in a further embodiment, may determine different contextual indicators from different sensors 106, such as determining a color of an object from an optical image and determining a temperature of an object from an infrared image, or the like.

In certain embodiments, one or more contextual indicators may not be determinable for a detected object. For example, a detected object may be obscured, may be too far away from a sensor 106, or the like, and the contextual data module 206 may be unable to determine certain contextual indicators for the detected object. In such a case, in various embodiments, the contextual data module 206 may estimate a contextual indicator, determine an expected contextual indicator, mark the contextual indicator as null or undeterminable, or the like.

The contextual data module 206, in one embodiment, determines contextual indicators for each object that the object detection module 202 detects. In a further embodiment, the contextual data module 206 may determine contextual indicators for a subset of objects that the object detection module 202 detects, such as a potential target pool, or the like. In one embodiment, the contextual data module 206 iteratively updates contextual indicators as the contextual data module 206 receives subsequent data from one or more sensors 106.

For example, certain contextual indicators that the contextual data module 206 was originally unable to determine, due to the distance of an object from a sensor, an object being obscured, or the like, may be evident in subsequent sensor data, due to a change in position of a sensor 106, a detected object, an obscuring object, or the like. In one embodiment, the object detection module 202 may detect one or more objects as the unmanned vehicle 102 and associated sensors 106 approach the objects from a distance, and an increasing amount of data for the objects may be available to the object detection module 202, the object tracking module 204, and/or the contextual data module 206 from the sensors 106 as the distance between the unmanned vehicle 102 and the objects decreases.

In one embodiment, the artificial intelligence module 208 estimates a probability that a detected object is a target object, matches a target object, and/or has another predefined relationship with a target object. The artificial intelligence module 208, in a further embodiment, estimates probabilities for detected objects based on correlation metrics from the object detection module 202, geographic locations from the object tracking module 204, contextual indicators from the contextual data module 206, known target contextual indicators associated with a target object, and/or other data associated with detected objects or a target object.

The artificial intelligence module 208, in one embodiment, estimates probabilities for detected objects using an artificial intelligence model. Examples of artificial intelligence models include Bayesian networks, decision networks, artificial neural networks, decision trees, support vector machines, fuzzy logic, symbolic such as expert systems and case-based reasoning, and/or other artificial intelligence systems. In a further embodiment, the artificial intelligence module 208 integrates several different artificial intelligence models to estimate a probability that a detected object is a target object. While example embodiments of the artificial intelligence module 208 are described below that use a Bayesian network artificial intelligence model, those of skill in the art, in light of this disclosure, will recognize other artificial intelligence models that the artificial intelligence module 208 may use to estimate probabilities as described herein.

In one embodiment, the artificial intelligence module 208 uses one or more Bayesian networks or similar artificial intelligence models that represents a set of random variables and conditional dependencies of the set of random variables as a directed acyclic graph ("DAG") or the like. A DAG, in one embodiment, includes a set of nodes (i.e. the set of random variables) with directed edges (i.e. the conditional dependencies) connecting the nodes without directed cycles or loops, meaning that no node is conditionally dependent on itself. The artificial intelligence module 208 may organize the set of random variables and the conditional dependencies, in various embodiments, as a single DAG, Bayesian network, or the like, or as several DAGs, Bayesian networks, or the like.

The random variables, in one embodiment, are random variables in the Bayesian sense, and may include observable quantities, latent variables, unknown parameters, hypotheses, and the like. In one embodiment, the set of random variables, or nodes, includes random variables representing correlation metrics, geographic locations, contextual indicators, and/or other variables upon which the artificial intelligence module 208 bases estimated probabilities. In a further embodiment, the set of random variables includes one or more random variables representing probabilities, confidences, and/or other values that the artificial intelligence module 208 is estimating or determining based on other random variables.

The conditional dependencies, or directed edges, of the set of random variables, in one embodiment, are defined by one or more probability functions. A probability function, in one embodiment, defines a probability distribution for a random variable or node given the parent random variable(s), if any. A probability function, in various embodiments, may be associated with a random variable, with one or more conditional dependencies, or both.

At least one probability function, in one embodiment, defines an estimated probability that a detected object is a target object based on input and/or estimated probable values for the set of random variables. The artificial intelligence module 208, in certain embodiments, estimates a probability that a detected object is a target object using one or more probability functions. For example, in one embodiment, each node is associated with a probability function that takes input as a particular set of values for the node's parent variables and gives the probability of the variable represented by the node, which may further be input into probability functions for child variables, and so on. In one embodiment, at least the probability functions corresponding to inputs from the contextual data module 206 are based on one or more target contextual indicators that indicate an expected physical property of a target object, and/or based on other known or expected data for a target object.

In one embodiment, one or more probability functions may be represented as probability tables. A probability table may include entries for possible values and/or combinations of values for random variables associated with the corresponding probability function. For example, in certain embodiments, a probability table for a probability function may include entries defining probabilities for a corresponding random variable given possible combinations of values for parent random variables. In a further embodiment, if a random variable is not conditionally dependent on a parent random variable, a probability table may include entries defining user provided, estimated, observed, or learned, probabilities for each possible value of the random variable. Examples of probability tables are discussed below with regard to FIGS. 5A, 5B, and 5C.

The artificial intelligence module 208, in one embodiment, iteratively updates estimated probabilities that detected objects are a target object based on updated correlation metrics, updated geographic locations, updated contextual indicators, and/or other updated inputs from the object detection module 202, the object tracking module 204, the contextual data module 206, or the like. In one embodiment, the artificial intelligence module 208 uses a static artificial intelligence model and re-calculates estimated probabilities to update the estimated probabilities. In a further embodiment, the artificial intelligence module 208 uses a dynamic artificial intelligence model and dynamically updates estimated probabilities based on updated input data.

In one embodiment, in addition to estimating probabilities, the artificial intelligence module 208 determines a confidence metric corresponding to each estimated probability. A confidence metric, in one embodiment, represents a strength of an estimated probability. The artificial intelligence module 208, in various embodiments, may base a confidence metric on a number of random variables or other nodes for which input data exists, on confidence levels associated with input data, on input data itself, on a random variable representing confidence, and/or on other confidence factors.

In one embodiment, the artificial intelligence module 208 selects a subset of objects detected by the object detection module 202 for the object tracking module 204 to track. For example, the artificial intelligence module 208 may select one or more detected objects as a potential target pool, or the like. In various embodiments, the artificial intelligence module 208 may select detected objects for the object tracking module 204 to track based on estimated probabilities, confidence metrics, and/or other data for detected objects. For example, in one embodiment, the artificial intelligence module 208 may select detected objects that have an estimated probability and/or confidence metric above a predefined threshold for the object tracking module 204 to track.

In one embodiment, the artificial intelligence module 208 automatically integrates over random variables with unknown data values. For example, in one embodiment, the artificial intelligence module 208 may use an expected value, an expected probability, a uniform distribution, or the like for unknown random variables. Unknown data values, in one embodiment, lower a confidence metric for a corresponding probability.

The artificial intelligence module 208, in one embodiment, receives inputs from the object detection module 202, the object tracking module 204, and/or the contextual data module 206 and outputs estimated probabilities and/or confidence metrics. The inputs that the artificial intelligence module 208 receives, in various embodiments, may include one or more data structures, such as arrays, vectors, matrices, tables, lists, sets, collections, trees, and/or other data structures. In one embodiment, the object detection module 202 provides a correlation feature vector, the object tracking module 204 provides a tracking feature vector, the contextual data module 206 provides an input data feature vector, or the like.

FIG. 3 depicts another embodiment of a target identification module 104. In one embodiment, the target identification module 104 is substantially similar to the target identification module 104 described above with regard to FIG. 1 and/or with regard to FIG. 2. The target identification module 104, in the depicted embodiment, includes the object detection module 202, the object tracking module 204, the contextual data module 206, and the artificial intelligence module 208 and further includes a target definition module 302, an object removal module 304, an identified target action module 306, a motion module 308, a data conditioning module 310, a persistent detection module 314, a multiple target module 316, and a report module 318.

The object detection module 202, in the depicted embodiment, includes a filter selection module 320, a correlation module 322, a correlation metric module 324, an object selection module 326, and an object merge module 328. The object tracking module 204, in the depicted embodiment, includes a multi-hypothesis module 330 and a track selection module 332. The artificial intelligence module 208, in the depicted embodiment, includes an artificial intelligence definition module 334, an object probability module 336, a confidence module 338, and an action module 340.

In one embodiment, the target definition module 302 determines known data for one or more target objects to facilitate detection and/or identification of the one or more target objects. The target definition module 302, in various embodiments, may receive known data of a target object from a user, may detect or interpolate known data of a target object from sensor data (such as photo, video, or infrared images; acoustic recordings; or the like), may retrieve known data from a database of predefined target objects, or may otherwise determine the known data. The target definition module 302, in certain embodiments, may provide known data of a target object to the object detection module 202, the object tracking module 204, the contextual data module 206, and/or the artificial intelligence module 208. For example, in one embodiment, the target definition module 302 provides a correlation filter bank for a target object to the object detection module 202, provides target contextual indicators for a target object to the artificial intelligence module 208, or the like.

In one embodiment, the known data that the target definition module 302 determines includes one or more spatial correlation filters for a target object. As described above with regard to the object detection module 202 of FIG. 2, in certain embodiments, a correlation filter is a reference template for a target object to facilitate pattern recognition or correlation. In one embodiment, the target definition module 302 creates a spatial correlation filter using one or more training chips extracted from images depicting a target object. In a further embodiment, the target definition module 302 removes the background of each training chip (i.e. the area not depicting the target object). The target definition module 302, in another embodiment, may replace the background of each training chip with the mean value of the training chip. In one embodiment, the target definition module 302 may apply a median filter and/or another type of filter to each training chip due to salt-and-pepper noise, or the like.

The target definition module 302, in one embodiment, selects training images and/or chips for a given correlation filter automatically in an iterative fashion. For example, in one embodiment, the target definition module 302 selects an initial training image for a filter and correlates the initial training image with the remaining images in the training set and calculates one or more correlation metrics for each correlation. Correlation metrics are described in greater detail below with regard to the correlation metric module 324. In certain embodiments, a correlation metric may include PCE, PSR, peak magnitude, standard deviation, or another correlation metric indicating correlation energy.

In the example, in a further embodiment, the target definition module 302 may add the image with the lowest correlation metric (and/or set of correlation metrics), such as PCE or the like, to the filter and repeat the process of correlating the filter with the remaining training images and selecting additional images (or chips) to the filter until the filter includes a maximum number of training images, or the like. In one embodiment, the target definition module 302 determines a maximum number of training images to include in a filter experimentally against a training database, or the like.

In one embodiment, once target definition module 302 has selected training images for a given filter, the target definition module 302 correlates the filter with a validation set of images that includes both in-class images (i.e. in-class with the target object) and out-of-class images (i.e. confusers, clutter, and/or other images out-of-class with the target object). The target definition module 302, in a further embodiment, determines one or more correlation metrics, such as PCE or the like, for each image from the validation set that the target definition module 302 correlates with the filter. In one embodiment, the target definition module 302 uses the validation set correlation metrics to determine a Fisher Ratio for the filter, measuring the class separation between the in-class and out-of-class images. One embodiment of a Fisher Ratio ("FR") for a filter is given by:

$$FR = \frac{(m_1 - m_2)^2}{\sigma_1^2 + \sigma_2^2} \quad (3)$$

In equation 3, $m_1$ is the correlation metric mean for in-class images, $m_2$ is the correlation metric mean for out-of-class images, $\sigma_1^2$ is the variance for in-class images, and $\sigma_2^2$ is the variance for out-of-class images. In one embodiment, the target definition module 302 uses the selected template images to generate one or more correlation filters that maximize the Fisher Ratio. In various embodiments, the target definition module 302 may generate one or more correlation filters using a minimum noise and correlation energy ("MINACE") method, an extended-maximum all correlation height ("EMACH") method, an eigen-extended maximum all correlation height ("EEMACH") method, or the like. In one embodiment, the target definition module selects free parameter values for the MINACE, EMACH, and/or EEMACH method to maximize the Fisher Ratio for a generated filter.

The one or more spatial correlation filters that the target definition module 302 generates, in one embodiment, each include a matrix with Fourier transforms of the training images included in the filter. For example, in one embodiment, a matrix of a spatial correlation filter has a size of d×n, where d is the number of pixels in the training images and n is the number of training images included in the spatial correlation filter. In one embodiment, the target definition module 302 uses the MINACE method or the like to generate a spatial correlation filter that includes a matrix. In a further embodiment, the target definition module 302 uses the EMACH method, the EEMACH method, or the like to generate a spatial correlation filter that includes one or more eigenvectors, eigenvector approximations, or the like.

In one embodiment, the target definition module 302 determines one or more target contextual indicators for a target object based on user input. The one or more target contextual indicators, in certain embodiments, each indicate an expected physical property of the target object. In one embodiment, target contextual indicators are substantially similar to the contextual indicators described above with regard to the contextual data module 206 of FIG. 2. Examples of target contextual indicators, in various embodiments, may include a color of a target object, an expected or estimated temperature of a target object, an estimated destination of a target object, a last known location of a target object, an expected location of a target object, an identifying feature or marking of a target object, known damage to a target object, capabilities of a target object, size of a target object such as height, length, width, etc., expected velocity of a target object, acceleration capabilities of a target object, and/or other known or expected properties of a target object.

In one embodiment, the target definition module 302 determines one or more target contextual indicators based on a previous encounter with a target object, based on previous surveillance of a target object, based on data associated with a target object from one or more sensors 106, or the like. The target definition module 302, in one embodiment, includes a user interface allowing a user to define a target object, select a target object, provide known data of a target object, initiate and/or direct correlation filter generation, provide target contextual indicators, and/or otherwise provide data of one or more target objects. In a further embodiment, the target definition module 302 defines, modifies, and/or updates one or more target contextual indicators based on detected attributes of the terrain 128, object tracks determined by the object tracking module 204, or the like.

In a further embodiment, the target definition module 302 determines additional or new known data for a target object, such as spatial correlation filters, target contextual indicators, and the like, on demand as new data for the target object becomes available. For example, the target definition module 302 may allow a user to initiate generation of new filters, to define new target contextual indicators, to modify existing known data, or the like while the target identification module 104 is deployed and actively detecting and identifying one or more target objects. In another embodiment, the target definition module 302 provides an interface for a user to make and/or update a selection of one or more defined target objects for the target identification module 104 to detect.

In one embodiment, the target definition module 302 determines information for the terrain 128 or other surroundings of a target object. The target definition module 302, in certain embodiments, determines one or more expected or typical locations for a target object, such as a home location, a work location, a last known location, an expected location, or the like. In one embodiment, the target definition module 302 may associate a location, a building, a structure, or the like with a target object. In a further embodiment, the target definition module 302 determines map information, user location annotations, points of interest, landmarks, GIS data, a digital elevation model, and/or other information for the terrain 128.

In one embodiment, the target definition module 302 provides known data of one or more target objects to the object detection module 202, the object tracking module 204, the contextual data module 206, and/or the artificial intelligence module 208. For example, in one embodiment, the target definition module 302 provides spatial correlation filters or other known data to the object detection module 202, provides data of the terrain 128 to the object tracking module 204, provides target contextual indicators to the artificial intelligence module 208, or the like.

In one embodiment, the object removal module 304 removes a detected object from a set of objects, such as a potential target pool or the like, in response to an estimated probability for the object satisfying a removal threshold. In another embodiment, the object removal module 304 removes a detected object from a set of objects, such as a potential target pool or the like, in response to an estimated probability for the object satisfying a removal threshold and a confidence metric for the object satisfying a confidence removal threshold. The object removal module 304, in various embodiments, may be integrated with or otherwise in communication with the object detection module 202 and/or the artificial intelligence module 208.

As described above with regard to the object detection module 202 of FIG. 2, in one embodiment, either the object detection module 202 or the artificial intelligence module 208 selects a subset of detected objects that have a predefined level of similarity with a target object, based on a correlation metric, an estimated probability, or the like, as a pool of potential target objects. In one embodiment, the object removal module 304 iteratively updates membership of detected objects in the pool of potential target objects by removing detected objects from the pool that satisfy a probability removal threshold and/or a confidence removal threshold, or the like. In one embodiment, the object tracking module 204 continues to track removed objects, to provide persistent removal of the objects from the pool of potential target objects.

In one embodiment, the identified target action module 306 performs an identified target action defined for an object in response to an estimated probability for the object satisfying an identification threshold. In a further embodiment, the identified target action module 306 performs the identified target action in response to both an estimated probability satisfying an identification probability threshold and a confidence metric satisfying an identification confidence threshold. The identified target action module 306, in one embodiment, performs an identified target action automatically upon the estimated probability and/or the confidence metric satisfying one or more identification thresholds. In another embodiment, the identified target action module 306 performs the identified target action in response to user input confirming the identified target action.

In one embodiment, the target definition module 302 defines one or more identified target actions for a specified target object and provides the identified target actions to the identified target action module 306. Examples of identified target actions, in various embodiments, may include delivering a payload to a target object, tracking or providing surveillance of a target object, engaging a target object, or the like. In one embodiment, a user at a control station 110, or the like, may define and/or select an identified target action on-demand during operation of the target identification module 104.

In one embodiment, the motion module 308 compensates for motion of one or more sensors 106 in data from the one or more sensors 106. The motion of the one or more sensors 106, in various embodiments, may be in response to movement of the unmanned vehicle 102, direct manipulation of the one or more sensors 106 to aim or redirect the sensors 106, or the like. For various types of image sensors 106, in one embodiment, the motion module 308 compensates for motion of an image sensor 106 between an image of the terrain 128 and a subsequent image of at least a portion of the terrain 128 by reorienting or realigning the subsequent image, by determining one or more fixed shared location in the image and the subsequent image, by determining ground coordinates for the image and/or the subsequent image, or by otherwise compensating for motion of the image sensor 106. In one embodiment, the motion module 308 compensating for motion of one or more sensors 106 allows the object tracking module 204 to determine accurate and consistent geographic locations, speeds, directions, acceleration, or the like for detected objects, even if the detected objects are also in motion.

In one embodiment, the data conditioning module 310 conditions or pre-processes data from the one or more sensors 106 to prepare the data for object detection. The data conditioning module 310, in a further embodiment, conditions the data from the one or more sensors 106 prior to the object detection module 202, the contextual data module 206, and/or the object tracking module 204 processing the data. In one embodiment, the data conditioning module 310 cleans up or improves the quality of poor data, incomplete data, or the like. For example, in various embodiments, the data conditioning module 310 may normalize brightness and/or contrast of image data, enhance and/or detect edges in image data, remove bad pixels from image data, filter sensor data for noise, and/or otherwise condition data from the one or more sensors 106.

In one embodiment, the persistent detection module 314 stores data of detected objects. The persistent detection module 314, in a further embodiment, stores the data of detected objects even if the detected object has been eliminated as a potential target object. For example, the persistent detection module 314 may maintain a list of persistent detections, tracking data, and the like to mask out detected objects that the artificial intelligence module 208 has eliminated as potential target objects, to prevent reprocessing of detected objects, or the like. As described above, in certain embodiments, the object tracking module 204 continues to track geographic locations of detected objects that the artificial intelligence module 208 has eliminated as potential target objects. In a further embodiment, the persistent detection module 314 stores the data of detected objects for post-detection data analysis.

In one embodiment, the persistent detection module 314 stores correlation data from the object detection module 202 such as correlation metrics, identifiers for correlation filters used, and the like. In another embodiment, the persistent detection module 314 stores tracking data from the object tracking module 204 such as geographic locations, estimated tracks, multiple hypothesis tracks, velocities, directions, and the like. In a further embodiment, the persistent detection module 314 stores contextual data from the contextual data module 206 such as contextual indicators for detected objects, or the like. In another embodiment, the persistent detection module 314 stores estimated probabilities, confidence metrics, node states, and/or other detection data from the artificial intelligence module 208. In a further embodiment, the persistent detection module 314 stores data from one or more sensors 106 for detected object, such as image chips, acoustic recordings, or the like.

In one embodiment, the persistent detection module 314 stores one or more data structures for each detected target object with the data corresponding to the target object. Examples of data structures include arrays, vectors, matrices, tables, lists, sets, collections, trees, and/or other data structures. In one embodiment, the persistent detection module 314 stores a correlation feature vector from the object detection module 202, a tracking feature vector from the object tracking module 204, an input data feature vector from the contextual data module 206, or the like.

The persistent detection module 314, in one embodiment, assigns a unique identifier to each detected target object. In another embodiment, the persistent detection module 314 stores data structures for detected objects in a detected object database. The detected object database may be accessible by the unique identifier, or by another key or index value, such as location, or the like. In one embodiment, the persistent detection module 314 provides the data of detected objects to the artificial intelligence module 208 as inputs for the artificial intelligence module 208 to estimate probabilities, confidence metrics, action states, and the like. In a further embodiment, the persistent detection module 314 stores probabilities, confidence metrics, action states, and/or other data from the artificial intelligence module 208 for each detected object.

In one embodiment, the multiple target module 316 facilitates the simultaneous detection and identification of multiple types or classes of target objects by the target identification module 104. To detect and identify multiple different types of target objects, in one embodiment, the target definition module 302 receives multiple target object definitions with known data of multiple target objects. In one embodiment, the artificial intelligence module 208 determines multiple probabilities for each detected object, such as probabilities for a detected object relative to each selected target object, or the like. In one embodiment, the artificial intelligence module 208 integrates detection of each target object in a single artificial intelligence model, such as a Bayesian network, or the like. In a further embodiment, the artificial intelligence module 208 uses several different artificial intelligence models, such as multiple Bayesian networks, or the like, to detect and/or identify different types of target objects. For example, in one embodiment, the artificial intelligence module 208 uses a separate Bayesian network for each selected target object type or class.

In one embodiment, the report module 318 communicates data of detected objects to a control station 110. The report module 318, in one embodiment, streams data from one or more sensors 106 to a control station 110. In a further embodiment, the report module 318 communicates identifiers of detected objects, probabilities, confidence metrics, estimated tracks, geographic locations, contextual indicators, image chips, regions of interest, and/or other data of detected objects to a control station 110. The control station 110, in various embodiments, may display the communicated data of detected objects, may store or archive the communicated data of detected objects, or the like.

The object detection module 202, in the depicted embodiment includes a filter selection module 320, a correlation module 322, a correlation metric module 324, an object selection module 326, and an object merge module 328. In one embodiment, the object detection module 202 is substantially similar to the object detection module 202 described above with regard to FIG. 2. The object detection module 202 depicted in FIG. 3 uses spatial correlation filtering to detect objects in data from one or more sensors 106.

In one embodiment, the filter selection module 320 selects one or more spatial correlation filters for the object detection module 202 to use to detect objects in a specific sensor image of the terrain 128. The filter selection module 320, in a further embodiment, estimates a scale of the sensor image, an angle of view of the sensor image, or the like and selects the one or more spatial correlation filters based on the estimated scale, the estimated angle of view, or the like. The filter selection module 320, in one embodiment, selects the one or more spatial correlation filters from a filter bank, a filter database, or the like. As described above with regard to the target definition module 302, the target definition module 302 may define spatial correlation filters for each specified target object. The filter selection module 320, in certain embodiments, selects a filter bank, set of filters, or the like that is closest in scale/range and angle to the sensor image.

In one embodiment, the correlation module 322 correlates the one or more spatial correlation filters that the filter selection module 320 selects with the sensor image of the terrain 128. Each correlation by the correlation module 322, in one embodiment, forms a correlation plane. The correlation module 322, in certain embodiments, correlates a selected spatial correlation filter with the image of the terrain by performing a Fourier transform on the image of the terrain and on the selected spatial correlation filter, multiplying the transformed image of the terrain by the transformed spatial correlation filter, and performing an inverse Fourier transform on a result of the multiplication to form a correlation plane. Examples of correlation using a Fourier transform, a fast Fourier transform, and the like, are described above with regard to the object detection module 202 of FIG. 2, including the description of equation 1 and equation 2.

In one embodiment, the correlation module 322 uses multiple processor cores having a parallel computing architecture, such as SMP, CUDA, OpenCL, GPGPU, DirectCompute, stream computing, or another parallel computing architecture to correlate filters with sensor images, perform Fourier transforms, and the like. In certain embodiments, correlating using multiple processor cores in parallel accelerates the detection of objects using correlation filtering, allowing the correlation module 322 to detect objects at or near real-time.

In one embodiment, the correlation metric module 324 determines one or more correlation metrics for each point in a correlation plane. As described above with regard to the object detection module 202 of FIG. 2, examples of correlation metrics include peak-to-correlation energy ("PCE"), peak-to-sidelobe ratio ("PSR"), peak magnitude, standard deviation, and the like. One embodiment of the PCE for a point in a correlation plane is given by $$PCE = \frac{c[x_0, y_0]}{\|c[x, y]\|} \tag{4}$$

In equation 4, the numerator represents the correlation peak value at the selected peak point in the correlation plane and the denominator represents the square root of the correlation plane energy in a region around the peak. For example, in one embodiment, the region around the peak could be defined as a window having a predefined size in pixels, such as 31×31, or the like. A PCE correlation metric is invariant to the energy of the input, and can be used without energy normalization. In certain embodiments, energy normalization can make objects harder to discriminate.

One embodiment of the PSR for a point in a correlation plane is given by $$PSR = \frac{c[x_0, y_0] - \mu}{\sigma} \tag{5}$$

In equation 5, $\mu$ represents the mean correlation value over a region centered on the selected peak and $\sigma$ represents the standard deviation of correlation values over the region. In one embodiment, the region is a square annular region with a punctured window, such as a 25×25 pixel square with a 5×5 pixel punctured window, or the like. The numerator includes the correlation peak value at the selected peak as described above with regard to equation 4, minus the mean correlation value. One of skill in the art, in light of this disclosure, will recognize other region sizes and shapes and other types of correlation metrics suitable for use by the correlation metric module 324.

In one embodiment, the object selection module 326 selects one or more objects from a correlation plane as detected objects based on the correlation metrics that the correlation metric module 324 determines. The object selection module 326, in a further embodiment, selects an object as a detected object based on a detection threshold. For example, the object selection module 326 may select each peak in a correlation plane that has a correlation metric greater than the detection threshold as a detected object. In one embodiment, the detection threshold is a histogram-based adaptive threshold, or the like, that yields a specified number of detections per unit area. In a further embodiment, the detection threshold t is given by $$t = \mu + \alpha * \sigma \qquad (6)$$

In equation 6, $\mu$ represents the mean correlation value for a correlation plane and $\sigma$ represents the standard deviation for the correlation plane. The value of $\alpha$ in equation 6 is a constant value. In one embodiment, $\alpha$ is selected based on a receiver operating characteristic ("ROC") curve representing the sensitivity or true positive versus false positive rate for the object selection module 326 as the detection threshold is varied. The object selection module 326, in certain embodiments, selects more detected object than are likely to be a target object (i.e. purposely selects false positive detections), allowing the artificial intelligence module 208 to discriminate between true positives and false positives using the artificial intelligence model, such as a Bayesian network, or the like.

In one embodiment, the object selection module 326 represents each detected object as a set of coordinates. The set of coordinates may include ground coordinates, relative coordinates within a correlation plane, coordinates for corners of a detected object, a center coordinate for a detected object and a radius of the detected object, or the like. In a further embodiment, the object selection module 326 associates one or more correlation metrics from the correlation metric module 324 with each detected object. The object selection module 326, in another embodiment, associates the filter that yielded the detection with each detected object.

In one embodiment, the object merge module 328 detects multiple detected objects within a predefined distance of each other in different correlation planes and combines the multiple detected objects from several different correlation planes into a single detected object. In embodiments where the filter selection module 320 selects multiple spatial correlation filters for the correlation module 322 to use, forming multiple correlation planes, the same physical object will often be detected in several correlation planes from different filters. The object merge module 328, based on coordinates or other locations for detected objects in each correlation plane from the object selection module 326, detects these duplicate detections of the same physical object in different correlation planes and combines them into a single detected object.

In one embodiment, the object merge module 328 combines data for the duplicate detections, such as correlation metrics, locations, and the like to form the single detected object. The object merge module 328, in one embodiment, selects the maximum correlation metric from a set of merged detections as the correlation metric for the single merged detected object, and associates the filter corresponding to the maximum correlation metric with the single merged detected object. In other embodiments, the object merge module 328 may average the correlation metrics of the set of merged detections, select a mean correlation metric from the set of merged detections, or otherwise combine correlation metrics from the set of merged detections. In one embodiment, the object merge module 328 combines location data for the set of merged detections, averaging the location data, selecting a center location, or the like.

In one embodiment, instead of merging multiple detections after the object selection module 326 selects detected objects, the object merge module 328 combines multiple correlation planes into a single merged correlation plane, and the object selection module 326 selects detected objects from the single merged correlation plane. For example, in certain embodiments, the object merge module 328 may combine correlation planes by summing the correlation planes, averaging the correlation planes, or otherwise merging data from multiple correlation planes into a single correlation plane.

The object tracking module 204, in the depicted embodiment, includes the multi-hypothesis module 330 and the track selection module 332. As described above with regard to FIG. 2, in certain embodiments, the object tracking module 204 estimates multiple hypothesis tracks for certain detected objects, selects a most likely track, and the like. In the embodiment depicted in FIG. 3, the object tracking module 204 estimates multiple hypothesis tracks using the multi-hypothesis module 330 and selects a most likely track using the track selection module 332.

In various embodiments, the multi-hypothesis module 330 may estimate multiple hypothesis tracks for each detected object, for detected objects in a potential target pool, for detected objects having a correlation metric (and/or a set of correlation metrics) that satisfies a predefined threshold, for a predefined number of detected objects, for detected objects that are obscured in sensor data, or the like. In one embodiment, the multi-hypothesis module 330 creates one or more hypothesis tracks for a tracked object in response to an ambiguous set of detections in subsequent data from one or more sensors 106. By creating a new hypothesis track in response to an ambiguity, in one embodiment, the multi-hypothesis module 330 allows more than one detection to update tracking information for a single detected object each update.

For example, where a single detected object appears to split into multiple detected objects, a single detected object is temporarily obscured behind a cover object and multiple detected objects emerge from the cover object, or another ambiguity arises, the multi-hypothesis module 330 may estimate a hypothesis track for each ambiguous object, at least until the original detected object can be positively identified. Once the original detected object is positively identified, in certain embodiments, the multi-hypothesis module 330 may separate the other hypothesis tracks and associated detections as individually tracked detected objects. The multi-hypothesis module 330, in one embodiment, tracks geographic locations, velocities, acceleration, and/or other location data for active hypothesis tracks substantially as described above with regard to the object tracking module 204 of FIG. 2.

In one embodiment, the track selection module 332 determines a likelihood for each hypothesis track. In another embodiment, the track selection module 332 selects one track from multiple hypothesis tracks for a detected object as a most likely track and determines an estimated geographic location for the detected object based on the most likely track. In one embodiment, the track selection module 332 may determine likelihoods for hypothesis tracks and/or select a most likely track using the artificial intelligence module. For example, in certain embodiments, the artificial intelligence module 204 may select a most likely track and/or a set of multiple hypothesis tracks for a detected object based on data for the detected object from the object detection module 202, data for the detected object from the contextual data module 204, known data for the terrain 128, and/or based on other data of the detected object, the terrain 128, or the like.

For example, the artificial intelligence module 204 and/or the track selection module 332 may select a most likely track based at least partially on known constraints on motion that the terrain 128 provides, such as topography, bodies of water, roads, foliage, buildings, structures, and/or other features of the terrain 128 that affect a path of a detected object. In a further embodiment, the track selection module 332, with or without assistance from the artificial intelligence module 208, tracks detected objects through complex motions and/or interactions between multiple detected objects, such as objects occupying the same point in time, and the like.

In one embodiment, the track selection module 332 prunes one or more unlikely track hypotheses for a detected object over time. The track selection module 332, in certain embodiments, no longer updates pruned hypothesis tracks. In another embodiment, the track selection module 332 associates one or more pruned tracks with a different detected object. The track selection module 332, in one embodiment, prunes a hypothesis track in response to the likelihood of the hypothesis track falling below a predefined threshold value. In a further embodiment, the track selection module 332 prunes a hypothesis track based on a score for the hypothesis track, such as a sequential probability ratio test score, a consistency score rating the consistency of the hypothesis track with other tracks, or the like. In one embodiment, the track selection module 332 prunes hypothesis tracks in several iterations or cycles. For example, in one embodiment, the track selection module 332 prunes hypothesis tracks first based on a sequential probability ratio test score and then prunes additional hypothesis tracks based on a global score that includes both the sequential probability ratio test score and a consistency score, or the like.

The artificial intelligence module 208, in the depicted embodiment, includes the artificial intelligence definition module 334, the object probability module 336, the confidence module 338, and the action module 340. In one embodiment, the artificial intelligence module 208 is substantially similar to the artificial intelligence module 208 described above with regard to FIG. 2.

In one embodiment, the artificial intelligence definition module 334 generates an artificial intelligence model for the artificial intelligence module 208. As described above with regard to FIG. 2, examples of artificial intelligence models include Bayesian networks, decision networks, artificial neural networks, decision trees, support vector machines, fuzzy logic, symbolic such as expert systems and case-based reasoning, and the like.

In one embodiment, the artificial intelligence definition module 334 generates an artificial intelligence model, such as a Bayesian network or the like, based on known data of one or more target objects provided to the artificial intelligence definition module 334 by the target definition module 302. Different types of known data that the target definition module 302 may determine, such as known correlation data, known geographic location data, known target contextual indicators, and the like are described above with regard to the target definition module 302.

In one embodiment, the artificial intelligence definition module 334 generates an artificial intelligence model that receives correlation metrics, geographic locations, contextual indicators, and/or other data of detected objects and outputs estimated probabilities that the detected objects comprise a target object, confidence metrics for estimated probabilities, action states, and/or other target identification information. As described above with regard to the artificial intelligence module 208 of FIG. 2, artificial intelligence models, such as Bayesian networks and the like, in various embodiments may include random variables, conditional dependencies, nodes, directed edges connecting nodes, probability functions, probability tables, and/or other artificial intelligence model components with a specific organization. The artificial intelligence definition module 334, in certain embodiments, defines, populates, arranges, organizes, or otherwise generates random variables, conditional dependencies, nodes, directed edges connecting nodes, probability functions, probability tables, and/or other artificial intelligence model components into a cohesive artificial intelligence model.

In one embodiment, the artificial intelligence definition module 334 generates an artificial intelligence model based on user input. For example, in certain embodiments, the artificial intelligence definition module 334 provides a user interface, such as a graphical user interface ("GUI"), a command line interface ("CLI"), or the like, to a user allowing the user to design, edit, or otherwise manipulate an artificial intelligence model. In a further embodiment, the artificial intelligence definition module 334 may provide one or more default artificial intelligence models or artificial intelligence model components to a user to customize for a specific target. In another embodiment, the artificial intelligence definition module 334 pre-populates an artificial intelligence model with one or more artificial intelligence components based on known data from the target definition module 302, or the like, and a user completes or updates the artificial intelligence model.

In one embodiment, the artificial intelligence definition module 334 generates an initial artificial intelligence model based on known data from the target definition module 302, based on user input, or the like, and updates or completes the artificial intelligence model using training, machine learning, or the like. For example, in one embodiment, the artificial intelligence definition module 334 may generate nodes, conditional dependencies, and the like for a Bayesian network automatically based on known data from the target definition module 302, and may generate probability functions or tables using training data or machine learning. Training data or machine learning, in various embodiments, may use previously acquired data, such as previous data from one or more sensors 106, previous missions of the unmanned vehicle 102, or the like, may use expert data, may use representative examples of expected probability distributions, or the like. In one embodiment, the artificial intelligence definition module 334 includes one or more training databases that store collected data. In a further embodiment, the artificial intelligence definition module 334 automatically generates an artificial intelligence model or an artificial intelligence model component based on data in the one or more training databases.

In one embodiment, the artificial intelligence definition module 334 is configured to update an artificial intelligence model on demand in the field. The artificial intelligence definition module 334, in one embodiment, allows a user to add a node, update a probability function, or otherwise adjust an artificial intelligence model on demand during object detection and identification. In a further embodiment, the artificial intelligence definition module 334 adjusts an artificial intelligence model on demand in the field based on collected data from the one or more sensors 106, or the like, further training, tuning, or learning probability distributions or other artificial intelligence components.

The depicted artificial intelligence module 208 includes an object probability module 336 that estimates a probability that a detected object comprises a target object and a confidence module 338 that determines a confidence metric for each estimated probability substantially as described above with regard to the artificial intelligence module 208 of FIG. 2. The artificial intelligence module 208 of FIG. 3 further includes an action module 340.

In one embodiment, the action module 340 estimates an action state for one or more detected objects based on data from one or more sensors 106. An action state is an activity that a detected object is involved in over time. In certain embodiments, activity states may vary based on a type of the detected object. For example, human objects, such as the persons 118, 120, may have action states such as "standing," "walking," "running," "sitting," "laying," "eating," "reading," "talking," "driving," "sleeping," or the like. Vehicle objects, such as the truck 114, the car 124, and the off-road vehicle 126 may have action states such as "turning," "stopping," "accelerating," "pursuing," "fueling," "parking," or the like.

The action module 340, in one embodiment, determines an action state using an artificial intelligence model. For example, the action module 340 may represent each possible action state for a type of detected object as a random variable in a Bayesian network or other artificial intelligence model and determine the most likely action state based on correlation metrics, geographic locations, tracks, contextual indicators, and/or other data for detected objects input into the artificial intelligence model. The artificial intelligence module 208, in certain embodiments, incorporates artificial intelligence models for the object probability module 336 and the action module 340 into a single artificial intelligence model, such as a single Bayesian network or the like, that outputs both estimated probabilities and action states for a detected objects. In other embodiments, the artificial intelligence module 208 uses several different artificial intelligence models, such as one that outputs estimated probabilities, one that outputs action states, or the like.

Figure 4:
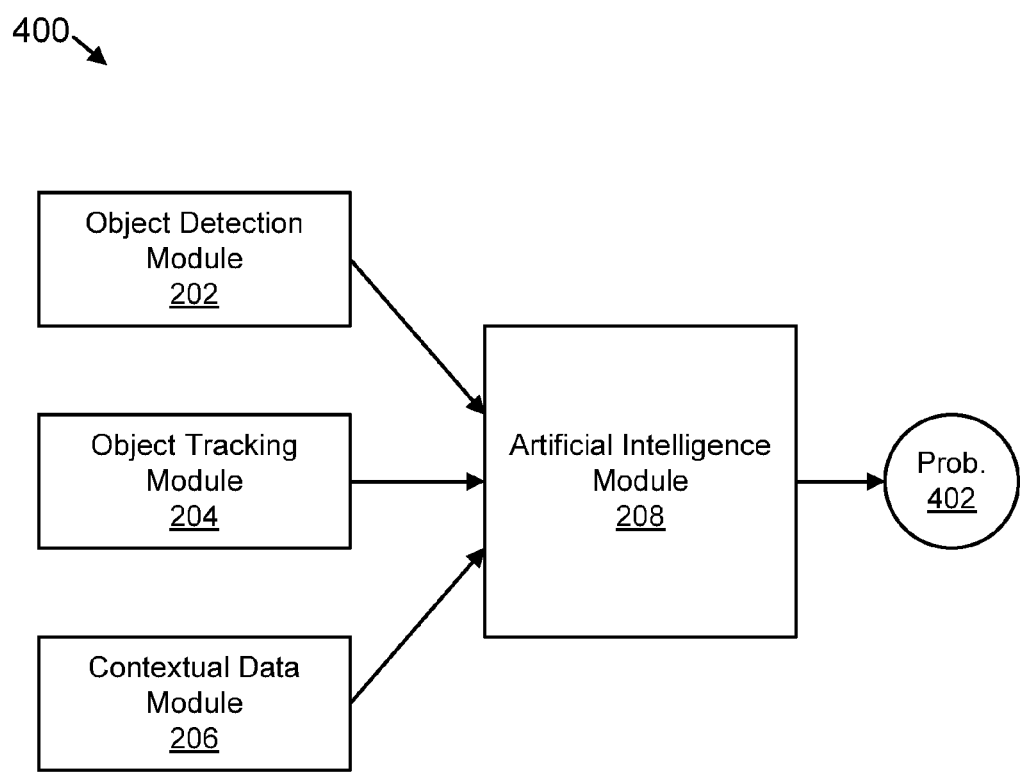
FIG. 4 is a schematic block diagram illustrating one embodiment of an artificial intelligence model to identify a target object in accordance with the present invention.

FIG. 4 depicts one embodiment of an artificial intelligence model 400. In the depicted embodiment of the artificial intelligence model 400, the object detection module 202, the object tracking module 204, and the contextual data module 206 each provide input data to the artificial intelligence module 208 and the artificial intelligence module 208 provides one or more probabilities 402. In other embodiments, the artificial intelligence module 208 may provide one or more confidence metrics for a probability 402, one or more action states for a detected object, or the like.

In one embodiment, the object detection module 202 provides one or more correlation metrics for a detected object as an input to the artificial intelligence module 208. The object tracking module 204, in one embodiment, provides a geographic location for a detected object to the artificial intelligence module 208 as an input. The contextual data module 206, in one embodiment, provides one or more contextual indicators for a detected object to the artificial intelligence module 208 as an input. As described above with regard to FIG. 2, in certain embodiments, the object detection module 202, the object tracking module 204, and the contextual data module 206 may provide the artificial intelligence module 208 input data in one or more data structures, such as arrays, vectors, matrices, tables, lists, sets, collections, trees, and/or other data structures. In one embodiment, the object detection module 202 provides a correlation feature vector, the object tracking module 204 provides a tracking feature vector, the contextual data module 206 provides an input data feature vector, or the like to the artificial intelligence module 208.

In one embodiment, the object detection module 202, the object tracking module 204, and the contextual data module 206 each provide input data to the artificial intelligence module 208 independently, and include a unique identifier of an associated detected object with the input data so that the artificial intelligence module 208 may associate the independently submitted input data with the associated detected object. In a further embodiment, the object detection module 202, the object tracking module 204, and the contextual data module 206 populate one or more detected object data structures with the input data and provide the detected object data structures to the artificial intelligence module 208. As described above with regard to the persistent detection module 314, in one embodiment, the persistent detection module 314 maintains the detected object data structures and provides them to the artificial intelligence module 208.

Figure 5A:
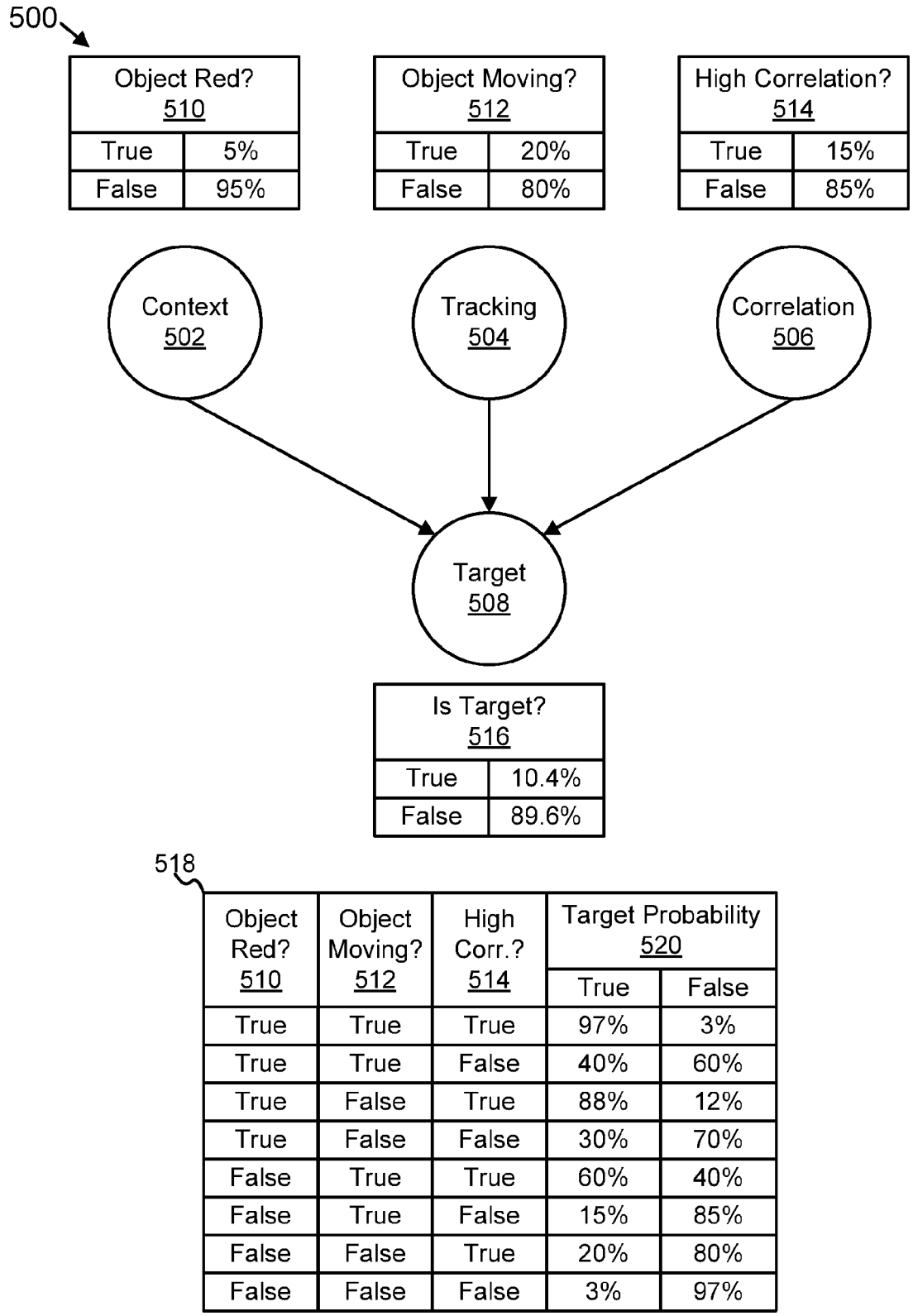
FIG. 5A is a schematic block diagram illustrating one embodiment of a Bayesian network to identify a target object in accordance with the present invention.

FIG. 5A depicts one embodiment of a Bayesian network 500 to identify a target object. The Bayesian network 500, in the depicted embodiment, includes a contextual data node 502, a tracking data node 504, a correlation metric node 506, and a target probability node 508. In the depicted embodiment, each node 502, 504, 506, 508 is associated with a data table 510, 512, 514, 516 that is pre-populated with default probabilities for the inputs or outputs of the particular node 502, 504, 506, 508. As described above with regard to the artificial intelligence definition module 334, the default probabilities may be provided by a user (such as an expert or the like), or based on training data, machine learning, or the like. In the example embodiment of FIG. 5A, a target object has been defined that is red and is moving. The target definition module 302 has also provided known data of the target object, such as spatial correlation filters, or the like, to the object detection module 202.

The context data table 510, the tracking data table 512, and the correlation data table 514, in certain embodiments, are probability tables associated with probability functions, however, because the contextual data node 502, the tracking data node 504, and the correlation metric node 506 are not conditionally dependent on a parent node, the nodes 502, 504, 506 use default or expected probabilities until the nodes 502, 504, 506 receive input values, and do not have a depicted probability table 518 as does the target probability node 508. The probability table 518, in the depicted embodiment, represents a probability function for the probability that a detected object comprises the target object, which is the value of the target probability node 508. The probability table 518 includes an entry for each possible combination of values for the parent nodes (random variables) of the target probability node 508, which, in the depicted embodiment, are the contextual data node 502, the tracking data node 504, and the correlation metric node 506.

For clarity, in the depicted embodiment, each node 502, 504, 506, 508 represents a random variable that has only two values, either true or false. In other embodiments, nodes may have any number of values. Each true or false value, in the depicted embodiment, may also have a probability associated with it. Similarly, for clarity, a single contextual data node 502, a single tracking data node 504, and a single correlation metric node 506 are depicted as parent nodes of the target probability node 508. In other embodiments, the Bayesian network 500 may include many different types and amounts of nodes, with various conditional dependencies. One of skill in the art, in light of this disclosure, will recognize other arrangements of nodes 502, 504, 506, 508 in a Bayesian network 500 suitable for use with the present invention and other types of artificial intelligence models.

Similarly, the contextual data node 502, the tracking data node 504, and the correlation metric node 506 are depicted as the parent nodes of the target probability node 508. In another embodiment, the target probability node 508 may be the parent node of the contextual data node 502, the tracking data node 504, and the correlation metric node 506. In certain embodiments, the two arrangements are logically equivalent, i.e. whether a detected object is a target object because it has certain input data or whether the detected object has certain input data because it is a target object may be logically equivalent, and yield the same probabilities in either case. In other embodiments, the nodes 502, 504, 506, 508 of the Bayesian network may be otherwise arranged in a different form of a DAG, with multiple levels of conditional dependencies, nodes for action states, confidence metrics, and the like.

In the depicted embodiment, no data has been input into the Bayesian network 500. The context data table 510 depicts the default probability or likelihood that a detected object will be red. The tracking data table 512 depicts the default probability or likelihood that a detected object will be moving. The correlation data table 514 depicts the default probability or likelihood that a detected object will have a "high" correlation metric. While, for the sake of clarity and illustration, a true/false value is used in the depicted embodiment to illustrate whether or not a correlation metric is "high," i.e. exceeds a correlation metric threshold, is above a predefined point in a correlation metric distribution, or the like, in other embodiments, ranges of correlation metrics may be used, a probability function that receives a correlation metric as an input may be used, sets of several correlation metrics for an object may be used, or the like.

The target data table 516, in the depicted embodiment, depicts a default output for the Bayesian network 500 with no input parameters. The values in the target data table 516, as depicted, are based on the default probabilities for the parent nodes 502, 504, 506 and the probability function represented by the probability table 518. In the depicted embodiment, the estimated probability that a detected object is a target object, without any input data, is 10.78%. In one embodiment, because no nodes 502, 504, 506 have input data, the artificial intelligence module 208 determines a low confidence metric. For example, in one embodiment, where the confidence metric represents a percentage of nodes with completed values, the confidence metric is 0.

Figure 5B:
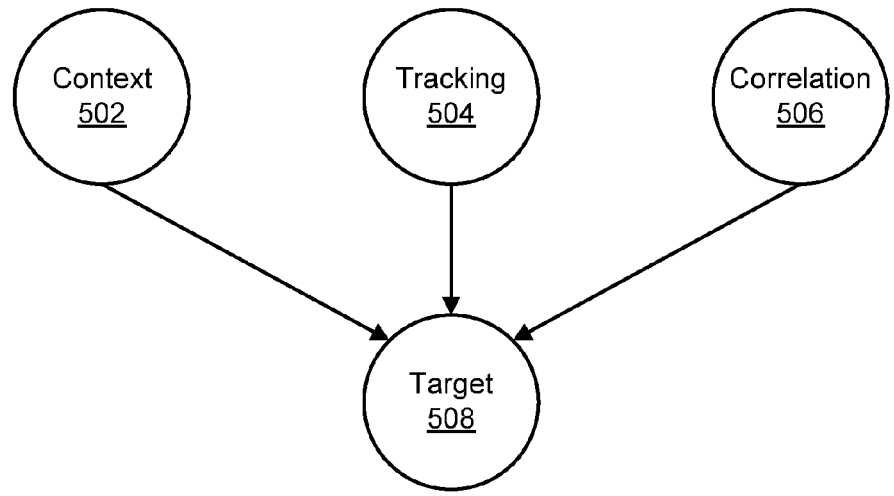
FIG. 5B is a schematic block diagram illustrating another embodiment of a Bayesian network to identify a target object in accordance with the present invention.

FIG. 5B depicts another embodiment of a Bayesian network 530 to identify a target object. In the depicted embodiment, the Bayesian network 530 is substantially similar to the Bayesian network 500 of FIG. 5A, but the object tracking module 204 has provided an input value to the tracking data node 504 for a specific detected object and the object detection module 202 has provided an input value to the correlation data node 506 for the detected object. Input data into a data table 510, 512, 514, 516, in the depicted embodiment, is highlighted by a thicker box, to differentiate the input data from default probabilities.

In the depicted embodiment, the object tracking module 204 determined that the detected object is moving, and the object detection module 202 determined that the detected object has a high correlation metric. Accordingly, in the depicted embodiment, the artificial intelligence module 208, based on the input data for the tracking data node 504 and the correlation data node 506, on the default probabilities for the context data node 502, and on the probability table 518, has adjusted the estimated probability that the detected object comprises the target object from the 10.78% estimate of FIG. 5A to an estimate of 42.85%. In one embodiment, the artificial intelligence module 208 also increases the confidence metric for the estimated probability because more nodes have received input data. For example, in one embodiment, the artificial intelligence module determines a confidence metric of 66%, because two of the three nodes that have inputs have received input values.

Figure 5C:
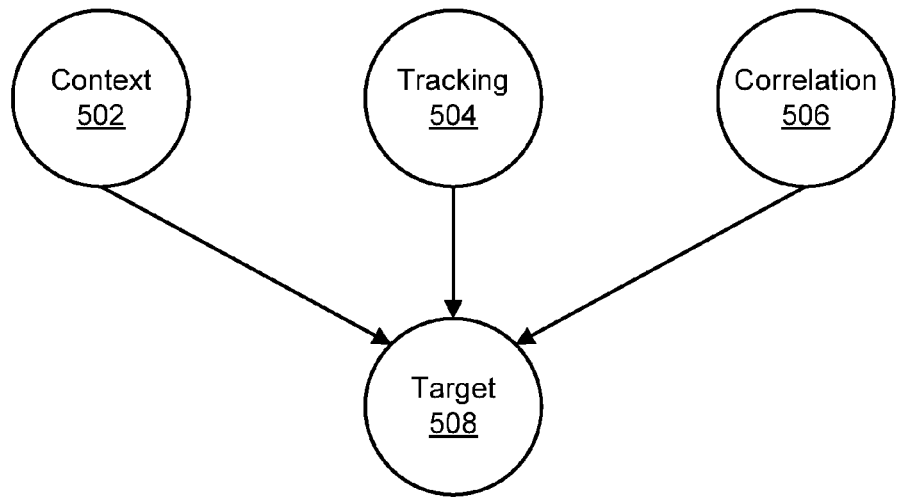
FIG. 5C is a schematic block diagram illustrating a further embodiment of a Bayesian network to identify a target object in accordance with the present invention.

FIG. 5C depicts a further embodiment of a Bayesian network 540 to identify a target object. The Bayesian network 540, in the depicted embodiment, is substantially similar to the Bayesian network 530 of FIG. 5B, but the contextual data module 206 determined that the detected object is red. Accordingly, in the depicted embodiment, the artificial intelligence module 208, based on the input data for the contextual data mode 502, the tracking data node 504, and the correlation data node 506, and on the probability table 518, has adjusted the estimated probability that the detected object comprises the target object from the 42.85% estimate of FIG. 5B to an estimate of 97%. In one embodiment, the artificial intelligence module 208 also increases the confidence metric for the estimated probability because more nodes have received input data. For example, in one embodiment, the artificial intelligence module determines a confidence metric of 100%, because all three of the nodes that have inputs have received input values.

Figure 6:
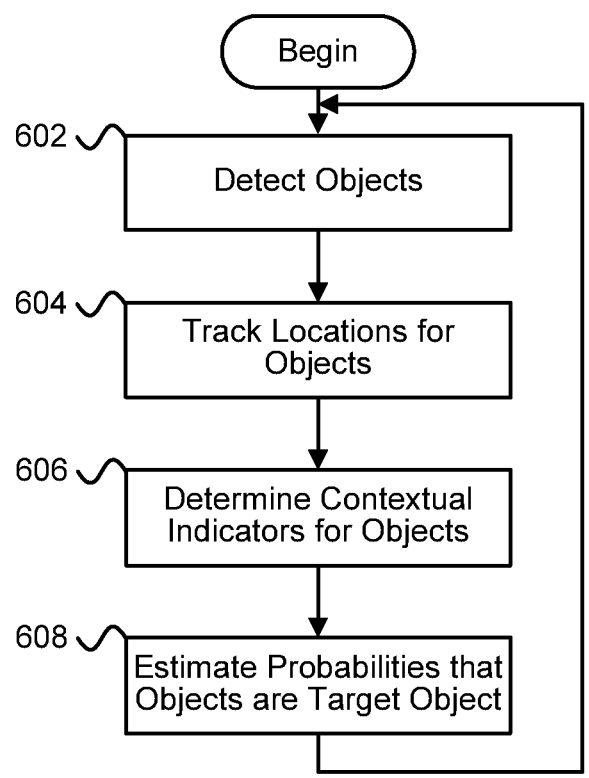
FIG. 6 is a schematic flow chart diagram illustrating one embodiment of a method for identifying a target object in accordance with the present invention.

FIG. 6 depicts one embodiment of a method 600 for identifying a target object. In the depicted embodiment, the method 600 begins, and the object detection module 202 detects 602 a plurality of objects. In one embodiment, the object detection module 202 detects 602 the objects by matching data from one or more sensors 106 to known data of a target object. The object detection module 202, in another embodiment, determines one or more correlation metrics for each object.

The object tracking module 204, in the depicted embodiment, tracks 604 geographic locations for at least a subset of the plurality of objects over time. In a further embodiment, the object tracking module 204 tracks 604 objects using subsequent data from the one or more sensors 106. In the depicted embodiment, the contextual data module 206 determines 606 one or more contextual indicators for at least a subset of the plurality of objects.

The artificial intelligence module 208, in the depicted embodiment, estimates 608 probabilities that each of at least a subset of the plurality of objects comprises the target object. In one embodiment, the artificial intelligence module 208 estimates 608 the probabilities based on the correlation metrics, the geographic locations, the contextual indicators, and one or more target contextual indicators associated with the target object. In a further embodiment, the artificial intelligence module 208 estimates 608 the probabilities using an artificial intelligence model.

Figure 7:
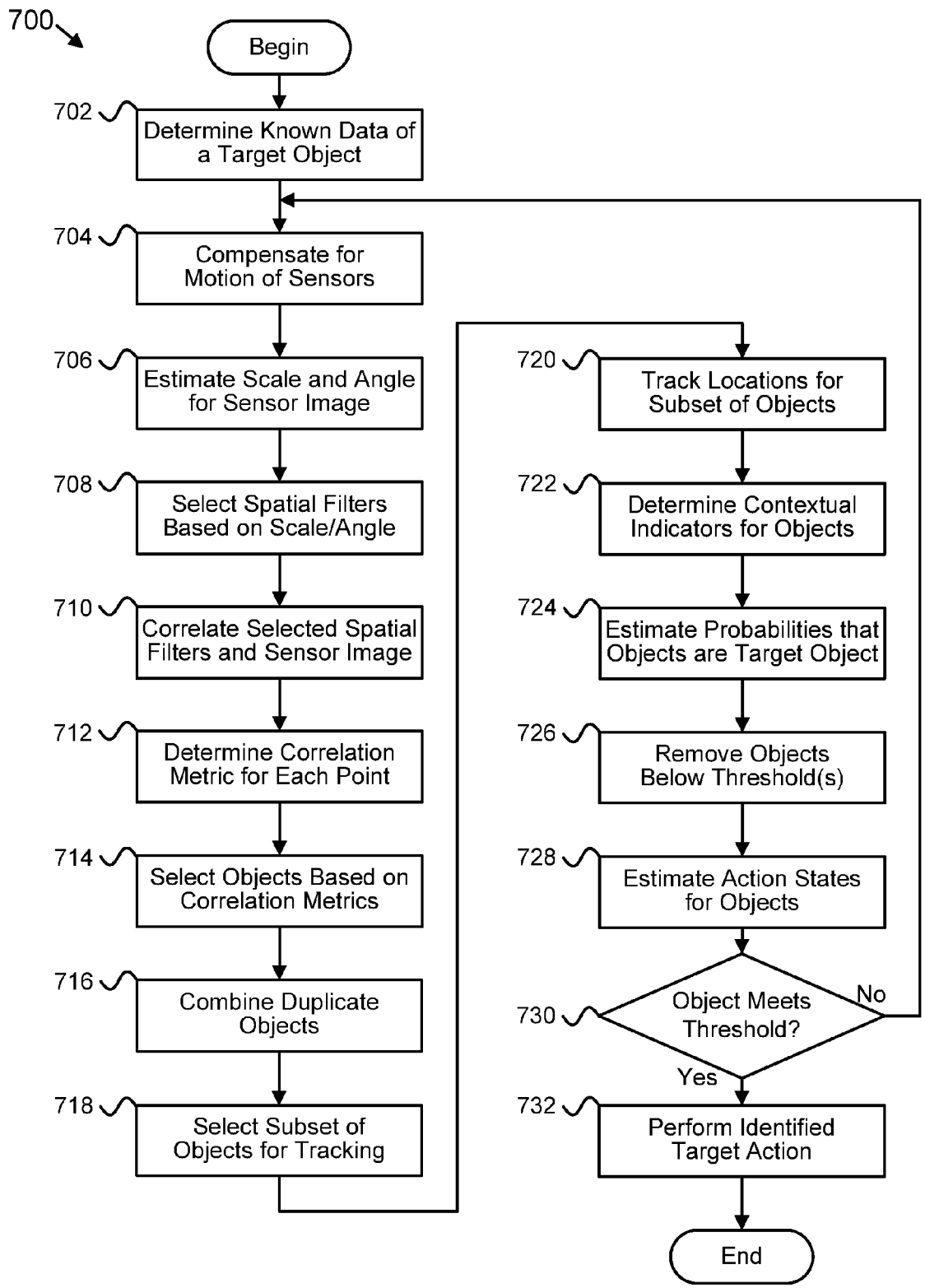
FIG. 7 is a schematic flow chart diagram illustrating another embodiment of a method for identifying a target object in accordance with the present invention.

FIG. 7 depicts another embodiment of a method 700 for identifying a target object. In the depicted embodiment, the method 700 begins, and the target definition module 302 determines 702 known data of a target object, such as spatial correlation filters, target contextual indicators, and the like. In a further embodiment, the artificial intelligence definition module 334 generates an artificial intelligence model for the artificial intelligence module 208 based on the known data that the target definition module 302 determines 702.

In the depicted embodiment, the motion module 308 compensates 704 for motion of the one or more sensors 106. The filter selection module 320, in the depicted embodiment, estimates 706 a scale and an angle of view for an image from the one or more sensors 106. The filter selection module 320 selects 708 one or more spatial correlation filters corresponding to the target object based on the estimated 706 scale and angle of view.

In the depicted embodiment, the correlation module 322 correlates 710 the selected 708 spatial correlation filters with the image from the one or more sensors 106 to form one or more correlation planes. The correlation metric module 324, in the depicted embodiment, determines 712 one or more correlation metrics for each point in the one or more correlation planes. The object selection module 326 selects 714 a plurality of detected objects based on the correlation metrics. The object merge module 328 combines 716 multiple detected objects from different correlation planes into a single detected object.

The artificial intelligence module 208, in the depicted embodiment, selects 718 a subset of the detected objects for the object tracking module 204 to track. The object tracking module 204 tracks 720 geographic locations for the selected 718 subset of the detected objects. The contextual data module 206, in the depicted embodiment, determines 722 one or more contextual indicators for at least a subset of the plurality of objects based on the data from the one or more sensors 106.

In the depicted embodiment, the artificial intelligence module 208 estimates 724 probabilities that each of at least a subset of the plurality of objects comprises the target object. The object removal module 304, in the depicted embodiment, removes 726, from a potential target pool, one or more detected objects with probabilities that satisfy a removal threshold. In a further embodiment, the removed 726 objects also have a confidence metric that satisfies a confidence removal threshold. The action module 340, in the depicted embodiment, estimates 728 an action state for one or more detected objects using the artificial intelligence model based on data from the one or more sensors 106.

The identified target action module 306, in the depicted embodiment, determines 730 whether or not the estimated 724 probability for a detected object satisfies an identification threshold. In a further embodiment, the identified target action module 306 also determines whether or not a confidence metric for a detected object satisfies an identification confidence threshold. In the depicted embodiment, if the identified target action module 306 determines 730 that none of the estimated 724 probabilities satisfy the identification threshold, the method 700 returns to the compensation step 704 and the method 700 continues, iteratively updating each step based on subsequent data from the one or more sensors 106. In the depicted embodiment, if the identified target action module 306 determines 730 that an estimated 724 probability satisfies the identification threshold (and, in certain embodiments, that the confidence metric satisfies the identification confidence threshold), the identified target action module 306 performs 732 an identified target action defined for the target object and the method 700 ends.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to identify a target object, the apparatus comprising:
   an object detection module that detects a plurality of objects by matching data from one or more sensors to known data of a target object, the object detection module determining one or more correlation metrics for each object;
   an object tracking module that tracks geographic locations for at least a subset of the plurality of objects over time using subsequent data from the one or more sensors;
   a contextual data module that determines one or more contextual indicators for at least a subset of the plurality of objects based on the data from the one or more sensors; and
   an artificial intelligence module that estimates probabilities that each of at least a subset of the plurality of objects comprises the target object based on the correlation metrics, the geographic locations, the contextual indicators, and one or more target contextual indicators associated with the target object, the artificial intelligence module estimating the probabilities by inputting at least the correlation metrics, the geographic locations, and the contextual indicators into an artificial intelligence model.

2. The apparatus of claim 1, further comprising a target definition module that determines the known data of the target object and the one or more target contextual indicators for the target object based on user input.

3. The apparatus of claim 2, wherein the known data comprises one or more spatial correlation filters corresponding to the target object, wherein the one or more target contextual indicators each indicate an expected physical property of the target object and the one or more contextual indicators for the plurality of objects each indicate a detected physical property of an object of the plurality of objects.

4. The apparatus of claim 2, wherein the target definition module updates one or more of the target contextual indicators based on the data from the one or more sensors.

5. The apparatus of claim 1, further comprising an object removal module that removes an object from the plurality of objects in response to the estimated probability for the object satisfying a removal threshold.

6. The apparatus of claim 1, further comprising an identified target action module that performs an identified target action corresponding to an object in response to the estimated probability for the object satisfying an identification threshold.

7. The apparatus of claim 1, further comprising a data conditioning module that conditions the data from the one or more sensors to prepare the data for the object detection module, the object tracking module, and the contextual data module.

8. The apparatus of claim 1, wherein the data from the one or more sensors comprises an image of terrain in which the plurality of objects are located and the subsequent data from the one or more sensors comprises a subsequent image of at least a portion of the terrain.

9. The apparatus of claim 8, wherein the object detection module comprises,
   a filter selection module that estimates a scale of the image of the terrain, estimates an angle of view for the image of the terrain, and selects one or more spatial correlation filters corresponding to the target object based on the estimated scale and the estimated angle of view;
   a correlation module that correlates the one or more selected spatial correlation filters and the image of the terrain to form one or more correlation planes;
   a correlation metric module that determines the one or more correlation metrics for each point in the one or more correlation planes; and
   an object selection module that selects the plurality of detected objects based on the correlation metrics.

10. The apparatus of claim 9, wherein the one or more correlation planes comprise a plurality of correlation planes and the object detection module further comprises an object merge module that detects multiple detected objects within a predefined distance of each other in different correlation planes and combines the multiple detected objects into a single detected object.

11. The apparatus of claim 9, wherein the correlation module correlates the one or more selected spatial correlation filters and the image of the terrain by performing a Fourier transform on the image of the terrain and on the one or more selected spatial correlation filters and, for each transformed spatial correlation filter, multiplying the transformed image of the terrain by the transformed spatial correlation filter and performing an inverse Fourier transform on a result of the multiplication to form one of the one or more correlation planes.

12. The apparatus of claim 9, wherein at least one of the one or more correlation metrics is selected from the group consisting of a peak-to-correlation energy ("PCE"), a peak-to-sidelobe ratio ("PSR"), a peak magnitude of a point in a correlation plane, and a standard deviation over a region of a correlation plane.

13. The apparatus of claim 8, further comprising a motion module that compensates for motion of the one or more sensors between the image of the terrain and the subsequent image of at least a portion of the terrain.

14. The apparatus of claim 1, further comprising an action module that estimates an action state for one or more of the plurality of objects based on the data from the one or more sensors and on the subsequent data from the one or more sensors, the action module estimating the action state using the artificial intelligence model.

15. The apparatus of claim 1, wherein the target object comprises a mobile object capable of independent physical motion.

16. The apparatus of claim 1, wherein the artificial intelligence module further selects a subset of the plurality of objects for the object tracking module to track.

17. The apparatus of claim 1, wherein the artificial intelligence model that the artificial intelligence module uses to estimate the probabilities comprises a Bayesian network model that represents a set of random variables and conditional dependencies of the set of random variables as a directed acyclic graph ("DAG").

18. The apparatus of claim 17, wherein the set of random variables includes random variables representing the correlation metrics, the geographic locations, and the contextual indicators.

19. The apparatus of claim 17, wherein the conditional dependencies of the set of random variables comprise one or more probability functions that define an estimated probability that a detected object comprises the target object based on values of the set of random variables, the artificial intelligence module estimating the probabilities using the one or more probability functions.

20. The apparatus of claim 19, wherein at least one of the one or more probability functions comprises a probability table with an entry for possible combinations of values for random variables associated with the at least one probability function from the set of random variables.

21. The apparatus of claim 1, wherein the object tracking module further estimates multiple hypothesis tracks for an object of the plurality of objects in response to the object being obscured in the subsequent data from the one or more sensors and tracks multiple hypothesis geographic locations for the object along the estimated multiple hypothesis tracks.

22. The apparatus of claim 21, wherein the object tracking module selects one of the multiple hypothesis tracks for the object as a most likely track and determines the geographic location for the object based on the most likely track.

23. The apparatus of claim 1, wherein the object detection module iteratively updates the correlation metrics based on the subsequent data from the one or more sensors, the object tracking module iteratively updates the geographic locations using the subsequent data from the one or more sensors, the contextual data module iteratively updates the one or more contextual indicators based on the subsequent data from the one or more sensors, and the artificial intelligence module iteratively updates the estimated probabilities that each of at least a subset of the plurality of objects comprises the target object based on the updated correlation metrics, the updated geographic locations, and the updated contextual indicators.

24. The apparatus of claim 1, wherein the geographic location that the object tracking module tracks for an object comprises geographic coordinates of the object, an estimated velocity of the object, and an estimated direction of the object.

25. The apparatus of claim 1, wherein at least one of the contextual indicators is selected from the group consisting of a color of an object, a temperature of an object, an estimated destination of an object, and an identifying marking on an object.

26. The apparatus of claim 1, wherein the artificial intelligence module further determines a confidence metric corresponding to each estimated probability, each confidence metric representing a strength of an estimated probability.

27. A system to identify a target object, the system comprising:
one or more sensors;
an object detection module that detects a plurality of objects by matching data from the one or more sensors to known data of a target object, the object detection module determining one or more correlation metrics for each object;
an object tracking module that tracks geographic locations for at least a subset of the plurality of objects over time using subsequent data from the one or more sensors;
a contextual data module that determines one or more contextual indicators for at least a subset of the plurality of objects based on the data from the one or more sensors; and
an artificial intelligence module that estimates probabilities that each of at least a subset of the plurality of objects comprises the target object based on the correlation metrics, the geographic locations, the contextual indicators, and one or more target contextual indicators associated with the target object, the artificial intelligence module estimating the using by inputting at least the correlation metrics, the geographic locations, and the contextual indicators into an artificial intelligence model.

28. The system of claim 27, further comprising one or more processors and a computer readable storage medium, the computer readable storage medium storing computer executable code of the object detection module, the object tracking module, the contextual data module, and the artificial intelligence module for execution on the one or more processors.

29. The system of claim 28, wherein the one or more processors comprise a plurality of processing cores and the object detection module matches the data from the one or more sensors to the known data in parallel on the plurality of processing cores.

30. The system of claim 29, wherein the plurality of processing cores comprise compute unified device architecture ("CUDA") cores.

31. The system of claim 28, further comprising an unmanned vehicle housing the one or more sensors, the one or more processors, and the computer readable storage medium.

32. A method for identifying a target object, the method comprising:
- detecting a plurality of objects by matching data from one or more sensors to known data of a target object and determining one or more correlation metrics for each object;
- tracking geographic locations for at least a subset of the plurality of objects over time using subsequent data from the one or more sensors;
- determining one or more contextual indicators for at least a subset of the plurality of objects based on the data from the one or more sensors; and
- estimating, using an artificial intelligence model, probabilities that each of at least a subset of the plurality of objects comprises the target object based on the correlation metrics, the geographic locations, the contextual indicators, and one or more target contextual indicators associated with the target object by inputting at least the correlation metrics, the geographic locations, and the contextual indicators into the artificial intelligence model.

33. The method of claim 32, further comprising determining the known data of the target object and the one or more target contextual indicators for the target object based on user input.

34. The method of claim 32, further comprising removing an object from the plurality of objects in response to the estimated probability for the object satisfying a removal threshold.

35. The method of claim 32, further comprising performing an identified target action corresponding to an object in response to the estimated probability for the object satisfying an identification threshold.

36. The method of claim 32, wherein the data from the one or more sensors comprises an image of terrain in which the plurality of objects are located and the subsequent data from the one or more sensors comprises a subsequent image of at least a portion of the terrain, the method further comprising,
- estimating a scale of the image of the terrain;
- estimating an angle of view for the image of the terrain;
- selecting one or more spatial correlation filters corresponding to the target object based on the estimated scale and the estimated angle of view;
- correlating the one or more selected spatial correlation filters and the image of the terrain to form one or more correlation planes;
- determining the one or more correlation metrics for each point in the one or more correlation planes; and
- selecting the plurality of detected objects based on the correlation metrics.

37. The method of claim 36, further comprising detecting multiple detected objects within a predefined distance of each other in different correlation planes from the one or more correlation planes and combining the multiple detected objects into a single detected object.

38. The method of claim 32, further comprising compensating for motion of the one or more sensors between the data from the one or more sensors and the subsequent data from the one or more sensors.

39. The method of claim 32, further comprising estimating an action state for one or more of the plurality of objects, using the artificial intelligence model, based on the data from the one or more sensors and on the subsequent data from the one or more sensors.

40. A computer program product comprising a non-transitory computer readable storage medium storing computer usable program code executable to perform operations for identifying a target object, the operations of the computer program product comprising:
- detecting a plurality of objects by matching data from one or more sensors to known data of a target object and determining one or more correlation metrics for each object;
- tracking geographic locations for at least a subset of the plurality of objects over time using subsequent data from the one or more sensors;
- determining one or more contextual indicators for at least a subset of the plurality of objects based on the data from the one or more sensors; and
- estimating, using an artificial intelligence model, probabilities that each of at least a subset of the plurality of objects comprises the target object based on the correlation metrics, the geographic locations, the contextual indicators, and one or more target contextual indicators associated with the target object by inputting at least the correlation metrics, the geographic locations, and the contextual indicators into the artificial intelligence model.

41. The computer program product of claim 40, the operations further comprising determining the known data of the target object and the one or more target contextual indicators for the target object based on user input, wherein the known data comprises one or more spatial correlation filters corresponding to the target object, the one or more target contextual indicators each indicate an expected physical property of the target object, and the one or more contextual indicators for the plurality of objects each indicate a detected physical property of an object of the plurality of objects.

42. The computer program product of claim 40, the operations further comprising compensating for motion of the one or more sensors between the data from the one or more sensors and the subsequent data from the one or more sensors.

43. The computer program product of claim 40, the operations further comprising estimating an action state for one or more of the plurality of objects, using the artificial intelligence model, based on the data from the one or more sensors and on the subsequent data from the one or more sensors.

* * * * *